(12) United States Patent
Sekine et al.

(10) Patent No.: US 9,028,929 B2
(45) Date of Patent: May 12, 2015

(54) LIGHT-EMITTING MEDIUM

(75) Inventors: Yoko Sekine, Tokyo-to (JP); Manabu Yamamoto, Ichikawa (JP); Mitsuru Kitamura, Tokyo-to (JP); Tsuyoshi Yamauchi, Abiko (JP); Akiko Kitamura, Nagareyama (JP); Sakurako Hatori, Nagareyama (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 13/814,814

(22) PCT Filed: Aug. 4, 2011

(86) PCT No.: PCT/JP2011/067875
§ 371 (c)(1),
(2), (4) Date: Apr. 12, 2013

(87) PCT Pub. No.: WO2012/020692
PCT Pub. Date: Feb. 16, 2012

(65) Prior Publication Data
US 2013/0189455 A1    Jul. 25, 2013

(30) Foreign Application Priority Data
Aug. 9, 2010   (JP) .................................. 2010-178926

(51) Int. Cl.
*B44F 1/08* (2006.01)
*C09D 11/50* (2014.01)
(Continued)

(52) U.S. Cl.
CPC .................. *B44F 1/08* (2013.01); *B41M 3/144* (2013.01); *B42D 2035/24* (2013.01);
(Continued)

(58) Field of Classification Search
USPC ........................................... 428/29
See application file for complete search history.

(56) References Cited

U.S. PATENT DOCUMENTS 6,173,896 B1 *  1/2001  Murl ............................. 235/487
7,802,725 B1 *  9/2010  Roth ............................. 235/454
(Continued)

FOREIGN PATENT DOCUMENTS

CN      101542331 A1    9/2009
EP      1 179 808 A1    2/2002
(Continued)

OTHER PUBLICATIONS

International Search Report dated Nov. 8, 2011 (with English translation).
(Continued)

*Primary Examiner* — David Sample
(74) *Attorney, Agent, or Firm* — Burr & Brown, PLLC

(57) ABSTRACT

A light-emitting medium having a light-emitting image including first pattern elements formed on a substrate by using a first fluorescent ink containing a first fluorescent material, and second pattern elements formed on the substrate by using a second fluorescent ink containing a second fluorescent material. The first and second pattern elements form a plurality of micro-character rows m, and the first pattern elements form a latent image in the micro-character rows m. The first fluorescent material is made of a fluorescent material which emits light of blue color when UV-A is irradiated, and emits light of red color when UV-C is irradiated. The second fluorescent material is made of a fluorescent material which emits light of blue color or light of a color that is viewed as the same color as the blue color when the UV-A is irradiated, and emits light of green color when the UV-C is irradiated.

10 Claims, 13 Drawing Sheets

(51) Int. Cl.
  *G07D 7/12*    (2006.01)
  *B42D 25/29*   (2014.01)
  *B41M 3/14*    (2006.01)
  *B42D 25/382*  (2014.01)
  *B42D 25/387*  (2014.01)

(52) U.S. Cl.
  CPC ........... *B42D 2035/44* (2013.01); *C09D 11/50* (2013.01); *G07D 7/122* (2013.01); *B42D 25/29* (2013.01); *B42D 25/382* (2013.01); *B42D 25/387* (2013.01); *Y10S 428/916* (2013.01)

(56) References Cited

U.S. PATENT DOCUMENTS

| | | | |
|---|---|---|---|
| 8,523,238 B2 * | 9/2013 | Sekine et al. | 283/92 |
| 2006/0180792 A1 * | 8/2006 | Ricci et al. | 252/301.16 |
| 2007/0119951 A1 * | 5/2007 | Auslander et al. | 235/491 |
| 2008/0116272 A1 * | 5/2008 | Giering et al. | 235/439 |
| 2009/0212115 A1 * | 8/2009 | Iftime et al. | 235/468 |
| 2010/0026450 A1 | 2/2010 | Hoshino et al. | |
| 2011/0298204 A1 * | 12/2011 | Eschbach | 283/67 |
| 2012/0256409 A1 * | 10/2012 | Giering et al. | 283/85 |

FOREIGN PATENT DOCUMENTS

| | | | |
|---|---|---|---|
| EP | 2 075 767 | A1 | 7/2009 |
| JP | 3030534 | U | 11/1996 |
| JP | 08-324094 | A1 | 12/1996 |
| JP | 09-156199 | A1 | 6/1997 |
| JP | 10-140500 | A1 | 5/1998 |
| JP | 10-219597 | A1 | 8/1998 |
| JP | 10-251570 | A1 | 9/1998 |
| JP | 10-315605 | A1 | 12/1998 |
| JP | 2003-112487 | A1 | 4/2003 |
| JP | 2004-174829 | A1 | 6/2004 |
| JP | 2005-036352 | A1 | 2/2005 |
| JP | 2007-193387 | A1 | 8/2007 |
| JP | 4418881 | B2 | 2/2010 |

OTHER PUBLICATIONS

Chinese Office Action (Application No. 201180048915.4) dated Feb. 17, 2014 (with English translation).

Japanese Office Action (Application No. 2010-178926) dated May 9, 2014 (with English translation).

* cited by examiner

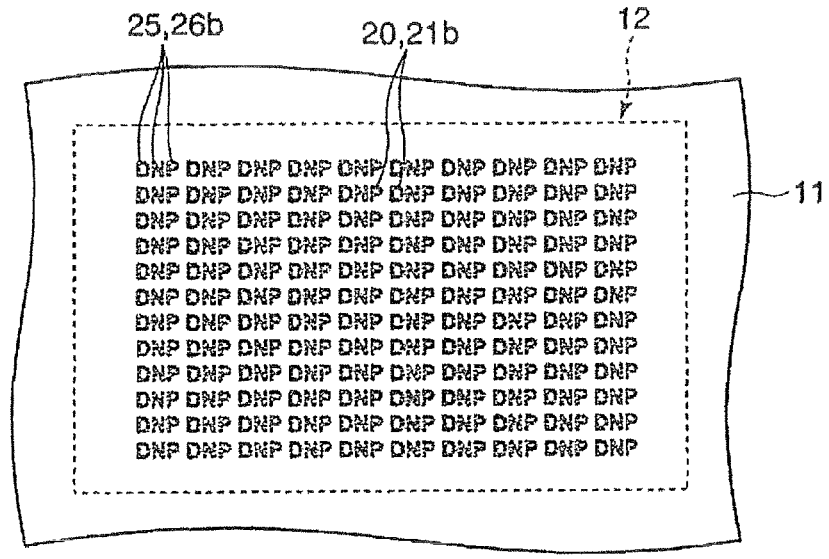
FIG. 6A  UV-A
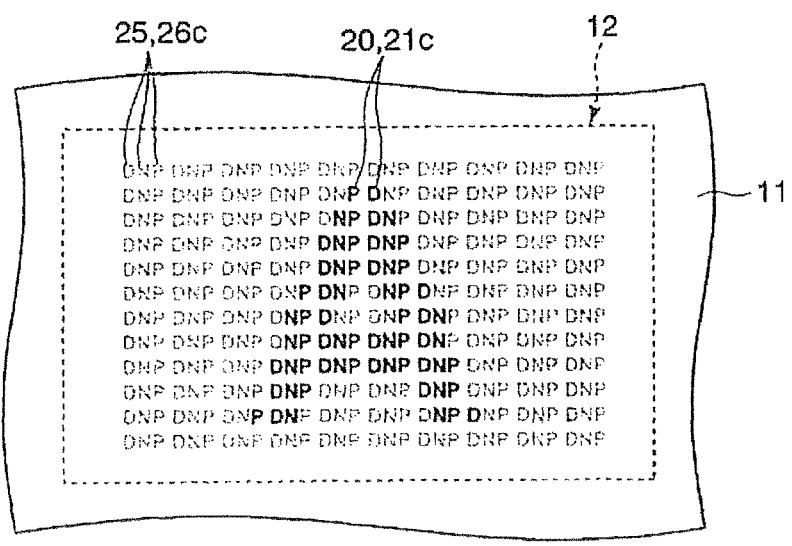
FIG. 6B  UV-C

LIGHT-EMITTING MEDIUM

TECHNICAL FIELD

The present invention relates to a light-emitting medium including a light-emitting image which appears when invisible light within a specific wavelength range is irradiated thereon.

BACKGROUND ART

In media such as valuable papers including cash vouchers and prepaid cards, identity cards including licenses, etc. which should be anti-counterfeit, there have been recently used a micro character, a copy guard pattern, an infrared-light absorbing ink, a fluorescent ink and so on, in order to improve security. The fluorescent ink is an ink including a fluorescent material which cannot be almost viewed under visible light, and can be viewed when invisible light (ultraviolet light or infrared light) is irradiated. With the use of such a fluorescent ink, there can be formed, on a valuable paper or the like, a fluorescent image (light-emitting image) which appears only when invisible light within a specific wavelength range is irradiated. Thus, it is possible to prevent that the valuable paper is easily forged by a generally used color printer or the like.

In addition, in order to further improve the anti-counterfeit effect, there is proposed that a light-emitting image, which cannot be viewed by the naked eye, is formed on a valuable paper by means of a fluorescent ink. For example, Patent Document 1 discloses a medium including a light-emitting image formed by using a first fluorescent ink and a second fluorescent ink. In this case, when seen with the naked eye, the first fluorescent ink and the second fluorescent ink are viewed as inks of the same color with each other, under visible light and ultraviolet light. On the other hand, when seen through a judging tool, the first fluorescent ink and the second fluorescent ink are viewed as inks of different colors from each other. Thus, the light-emitting image formed on the valuable paper cannot be easily forged, whereby the anti-counterfeit effect through the fluorescent inks can be enhanced. However, if there is a slight color difference or a thickness difference between the first fluorescent ink and the second fluorescent ink, there is a possibility that, when seen through the naked eye, the first fluorescent ink and the second fluorescent ink are not viewed as inks of the same color, whereby the light-emitting image is viewed.

Patent Document 1: JP4418881B

SUMMARY OF INVENTION

A procedure for judging whether a valuable paper is a counterfeit one or not is preferably performed easily and promptly. In addition, a valuable paper is preferably difficult to be forged. Thus, there is demand for a medium, which is difficult to be forged, by which whether a valuable paper is a counterfeit one or not can be easily and promptly judged by the naked eye, without using any tool such as a judging tool or the like.

The object of the present invention is to provide a light-emitting medium which is capable of effectively solving such a problem.

The present invention is a light-emitting medium including a light-emitting image on a substrate, wherein: the light-emitting image includes a plurality of first pattern elements containing a first fluorescent material and a plurality of second pattern elements containing a second fluorescent material; the plurality of first pattern elements and the plurality of second pattern elements form a plurality of micro-characters; the plurality of micro-characters form micro-character rows, and the first pattern elements form a latent image in the micro-character rows; when invisible light within a first wavelength range is irradiated, the first fluorescent material and the second fluorescent material emit light of colors that are viewed as the same color with each other; and when invisible light within a second wavelength range is irradiated, the first fluorescent material and the second fluorescent material emit light of colors that are viewed as different colors from each other, whereby the latent image in the micro-character rows is caused to appear.

In the light-emitting medium according to the present invention, when the invisible light within the first wavelength range is irradiated, the first fluorescent material may emit light of a first color, and the second fluorescent material emit light of the first color or light of a color that is viewed as the same color as the first color, and when the invisible light within the second wavelength range is irradiated, the first fluorescent material may emit light of a second color, and the second fluorescent material may emit light of a third color or does not emit light, so that the first fluorescent material and the second fluorescent material emit light of colors that are viewed as different colors from each other, whereby the latent image in the micro-character rows is caused to appear.

In the light-emitting medium according to the present invention, when the invisible light within the first wavelength range is irradiated, the first fluorescent material may emit light of a first color, and the second fluorescent material may emit light of the first color or light of a color that is viewed as the same color as the first color, and when the invisible light within the second wavelength range is irradiated, the first fluorescent material may emit light of the first color or light of a color that is viewed as the same color as the first color, and the second fluorescent material may emit light of a third color or does not emit light, so that the first fluorescent material and the second fluorescent material emit light of colors that are viewed as different colors from each other, whereby the latent image in the micro-character rows is caused to appear.

The present invention is a light-emitting medium including a light-emitting image on a substrate, wherein: the light-emitting image includes a plurality of first pattern elements and a plurality of second pattern elements; the plurality of first pattern elements and the plurality of second pattern elements form a plurality of micro-characters; the plurality of micro-characters form micro-character rows, and the first pattern elements form a latent image in the micro-character rows; when invisible light within a first wavelength range is irradiated or when invisible light within a second wavelength range is irradiated, the first fluorescent material and the second fluorescent material emit light of colors that are viewed as the same color with each other; and when the invisible light within the first wavelength range and the invisible light within the second wavelength range are simultaneously irradiated, the first fluorescent material and the second fluorescent material emit light of colors that are viewed as different colors form each other, whereby the latent image in the micro-character rows is caused to appear.

The present invention is a light-emitting medium including a light-emitting image on a substrate, wherein: the light-emitting image includes a plurality of first pattern elements and a plurality of second pattern elements; the plurality of first pattern elements and the plurality of second pattern elements form a plurality of micro-characters; the plurality of micro-characters form micro-character rows, and the first pattern elements form a latent image in the micro-character rows;

when invisible light within a first wavelength range is irradiated, the first fluorescent material and the second fluorescent material emit light of colors that are viewed as different colors from each other, whereby the latent image in the micro-character range is caused to appear; when invisible light within a second wavelength range is irradiated, the first fluorescent material and the second fluorescent material emit light of colors that are viewed as different colors from each other, the color of light being different from the color of light viewed when the invisible light within the first wavelength range is irradiated, whereby the latent image in the micro-character rows is caused to appear; and when the invisible light within the first wavelength range and the invisible light within the second wavelength range are simultaneously irradiated, the first fluorescent material and the second fluorescent material emit light of colors that are viewed as the same color with each other.

In the light-emitting medium according to the present invention, a size of the one micro-character in the plurality of micro-character rows may be not more than 300 μm square.

In the light-emitting medium according to the present invention, an interval between the adjacent micro-characters in the plurality of micro-character rows may be not more than 100 μm.

In the light-emitting medium according to the present invention, the one micro-character in the plurality of micro-character rows may include the first pattern element and the second pattern element.

According to the light-emitting medium of the present invention, it is possible to confirm the light-emitting image easily and promptly, and forging of the light-emitting medium can be made difficult.

BRIEF DESCRIPTION OF DRAWINGS

FIG. 6A is a plan view showing the light-emitting image when UV-A is irradiated thereon, in the first embodiment of the present invention.

FIG. 6B is a plan view showing the light-emitting image when UV-C is irradiated thereon, in the first embodiment of the present invention.

DETAILED DESCRIPTION OF THE INVENTION

First Embodiment

A first embodiment of the present invention will be described herebelow with reference to FIGS. 1 to 6B. At first, an anti-counterfeit medium 10 made of a light-emitting medium of the present invention is described as a whole with reference to FIGS. 1 to 3.

Anti-Counterfeit Medium

Figure 1:
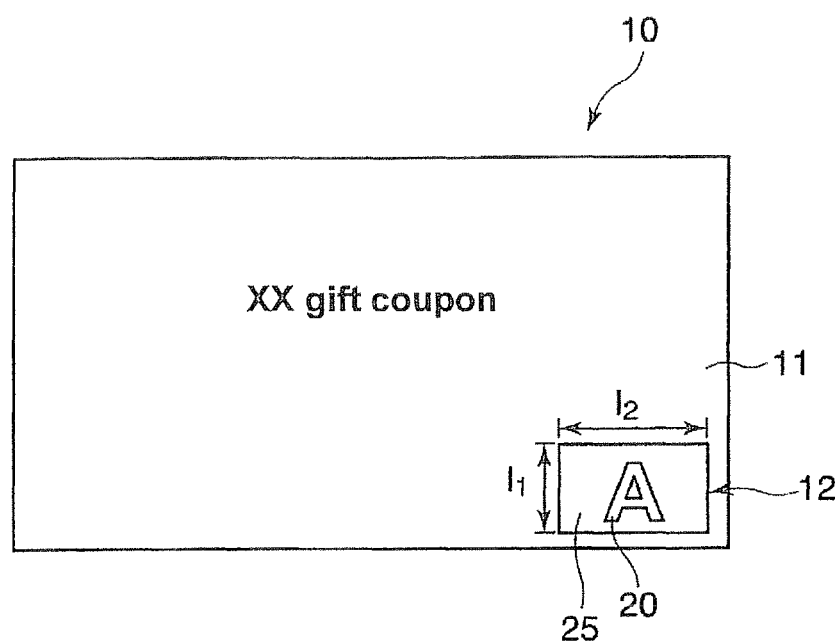
FIG. 1 is a plan view showing an example of a valuable paper constituted by an anti-counterfeit medium made of a light-emitting medium of the present invention.

FIG. 1 is a view showing an example of a gift coupon (valuable paper) constituted by the anti-counterfeit medium 10 according to this embodiment. As shown in FIG. 1, the anti-counterfeit medium 10 includes a substrate 11 and a light-emitting image 12 formed on the substrate 11. In this embodiment, as described below, the light-emitting image 12 functions as an authenticity judging image for judging authenticity of the anti-counterfeit medium 10.

A material of the substrate 11 used in the anti-counterfeit medium 10 is not specifically limited, and the material is suitably selected depending on a type of a valuable paper constituted by the anti-counterfeit medium 10. For example, as a material of the substrate 11, there is used white polyethylene terephthalate having excellent printability and processability. A thickness of the substrate 11 is suitably set depending on a type of a valuable paper constituted by the anti-counterfeit medium 10.

A size of the light-emitting image 12 is not specifically limited, and the size is suitably set depending on easiness in authenticity judgment and required judgment precision. For example, a length $l_1$ and a length $l_2$ of the light-emitting image 12 are within a range of 1 to 210 mm and a range of 1 to 300 mm, respectively.

Light-Emitting Image

Figure 2:
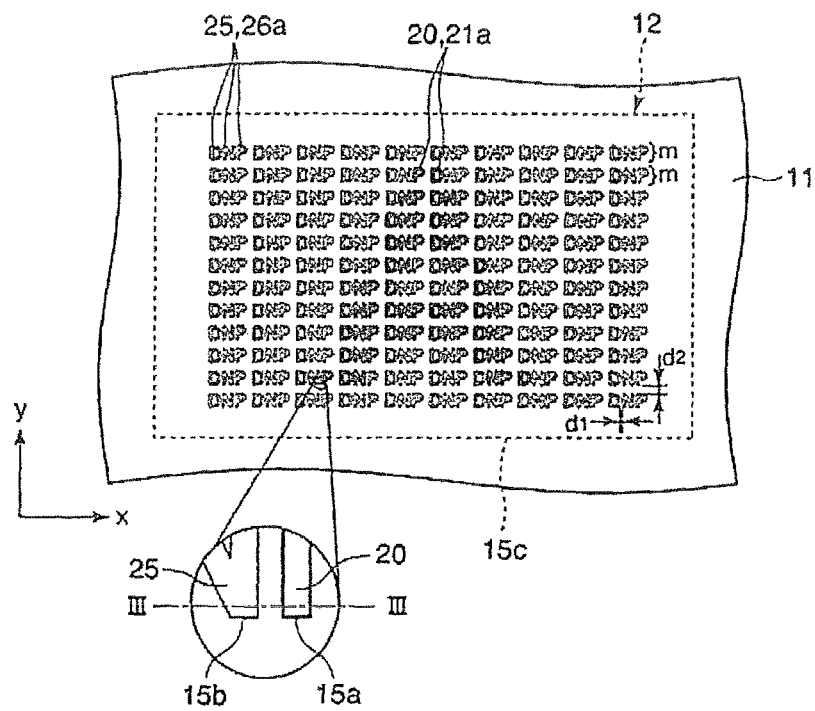
FIG. 2 is a plan view showing a light-emitting image of the anti-counterfeit medium in a first embodiment of the present invention.
Figure 3:
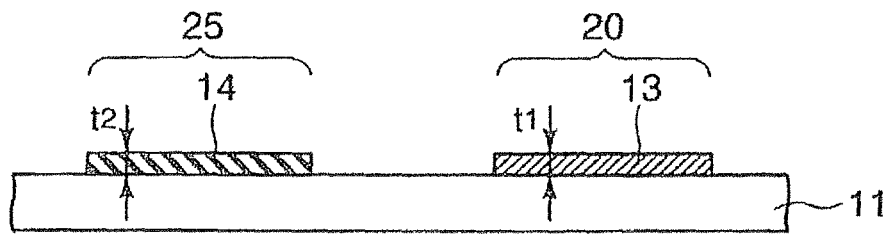
FIG. 3 is a sectional view taken along a line III-III of the light-emitting image shown in FIG. 2.

Next, the light-emitting image 12 is described in more detail with reference to FIGS. 2 and 3. FIG. 2 is a plan view showing the light-emitting image 12 in enlargement under visible light. FIG. 3 is a sectional view taken along a line III-III of the light-emitting image 12 shown in FIG. 2.

The light-emitting image 12 includes a plurality of first pattern elements 20 and a plurality of second pattern elements 25. In the example shown in FIG. 2, each of the first pattern elements 20 and each of the second pattern elements 25 constitute micro-characters of "D", "N" and "P". Ten sets of the series of micro-characters "DNP" are arranged in an x direction to form micro-character rows m. Twelve micro-character rows m are arranged in a y direction. The first pattern elements 20 form a latent image in the micro-character rows. Herein, the latent image is a character "A".

A size of one micro-character in the plurality of micro-character rows m is preferably not more than 300 μm square, and is herein 200 μm square, for example. An interval d1 between the micro-characters that are adjacent in the x direction of the micro-character rows m, and an interval d2 between the micro-characters that are adjacent in the y direction are preferably not more than 100 μm, respectively. Herein, the interval d1 is 50 μm and the interval d2 is 100 μm, for example.

Although the resolution of a human naked eye differs by an acuity of vision and a distance from the eye to an object, a recognizable resolution limit of a person whose acuity of vision is 1.5 at a distance of distinct vision of 250 mm is, for example, $250*\tan(1/1.5/60)*2=0.1$ (mm).

The resolution limit herein means a distance at which two adjacent points can be recognized as two points.

When the size of the character is not more than 300 μm square, an interval between lines constituting the character is often about 100 μm. Such a character cannot be generally recognized as a character by the naked eye.

When the interval between characters is not more than 100 μm, adjacent characters cannot be recognized as different characters.

The respective first pattern elements 20 and the respective second pattern elements 25 are formed by printing fluorescent inks which are excited by invisible light to emit fluorescent light, in the manner as described below.

A structure of the light-emitting image 12 is described with reference to FIG. 3. As shown in FIG. 3, the first pattern element 20 of the light-emitting image 12 and the second pattern element 25 thereof are formed by printing a first fluorescent ink 13 and a second fluorescent ink 14 on the substrate 11.

A thickness $t_1$ of the first fluorescent ink 13 and a thickness $t_2$ of the second fluorescent ink 14 are suitably set depending on a type of a valuable paper, a printing method and so on. For example, the thickness $t_1$ is within a range of 0.3 to 100 μm, and the thickness $t_2$ is within a range of 0.3 to 100 μm. Preferably the thickness $t_1$ and the thickness $t_2$ are substantially the same with each other.

As described below, the first fluorescent ink 13 and the second fluorescent ink 14 respectively contain predetermined fluorescent materials, such as particulate pigments, which do not emit light under visible light and emit light under specific invisible light. Herein, for example, a particle diameter of the pigments contained in the inks 13 and 14 is within a range of 0.1 to 10 μm, preferably within a range of 0.1 to 3 μm. Thus, when the visible light is irradiated on the inks 13 and 14, the light is scattered by the pigment particles. Therefore, as shown in FIG. 2, when the light-emitting image 12 is seen under the visible light, white first pattern elements 21a are viewed as the first pattern elements 20, and white second pattern elements 26a are viewed as the second pattern elements 25. As described above, the substrate 11 is made of white polyethylene terephthalate. For this reason, under the visible light, the substrate 11, the first pattern element 20 of the light-emitting image 12 and the second pattern element 25 thereof are all viewed as areas of white color. Thus, the latent image of the first pattern elements 20 of the light-emitting image 12 does not appear under the visible light. Accordingly, the anti-counterfeit medium 10 including the light-emitting image 12 can be prevented from being easily forged.

In FIG. 2, a line 15a showing each first pattern element 20, a line 15b showing each second pattern element 25, and line 15c showing the light-emitting image 12 are drawn as a matter of convenience. Under the visible light, the line 15a, the line 15b and the line 15c cannot be actually viewed.

Fluorescent Inks

Figure 4A:
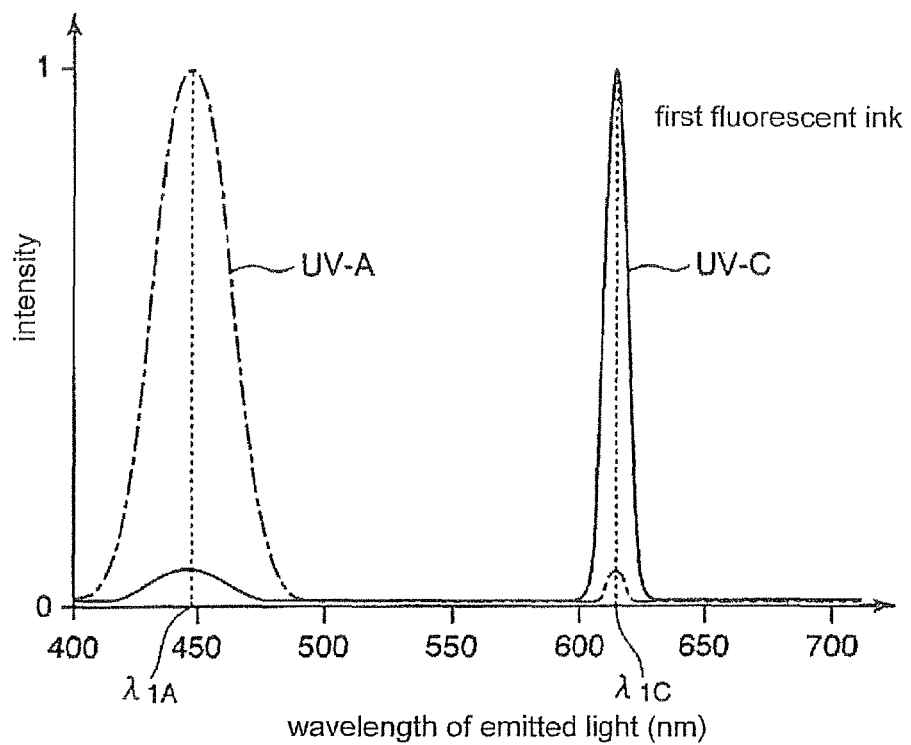
FIG. 4A is a view showing a fluorescence emission spectrum of a first fluorescent ink in the first embodiment of the present invention.
Figure 4B:
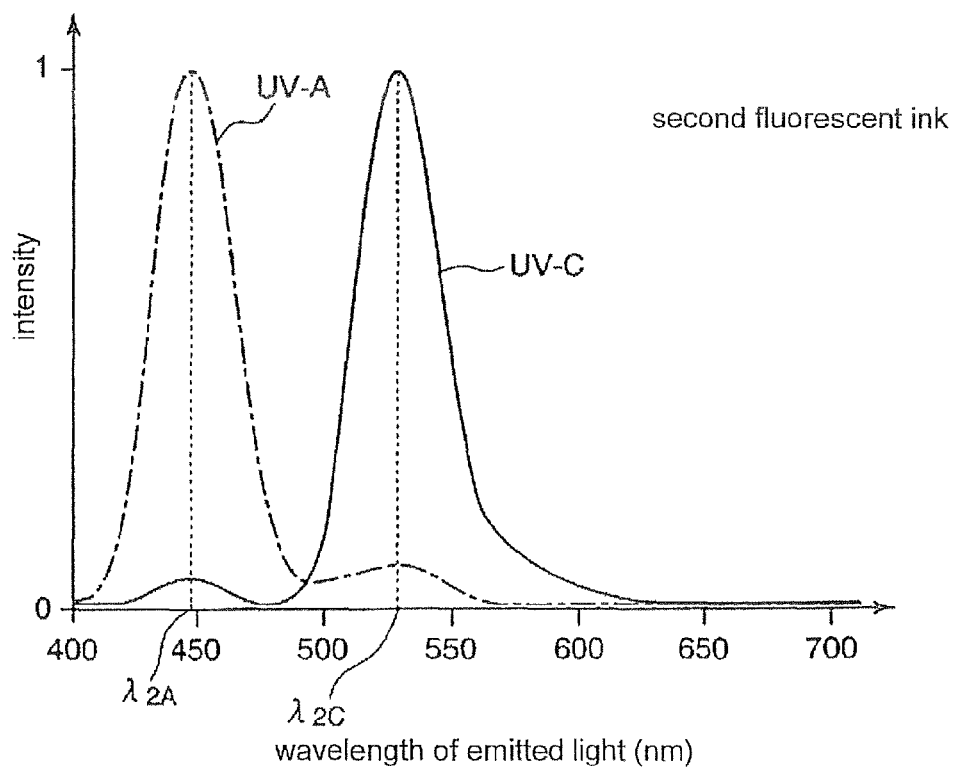
FIG. 4B is a view showing a fluorescence emission spectrum of a second fluorescent ink in the first embodiment of the present invention.
Figure 5:
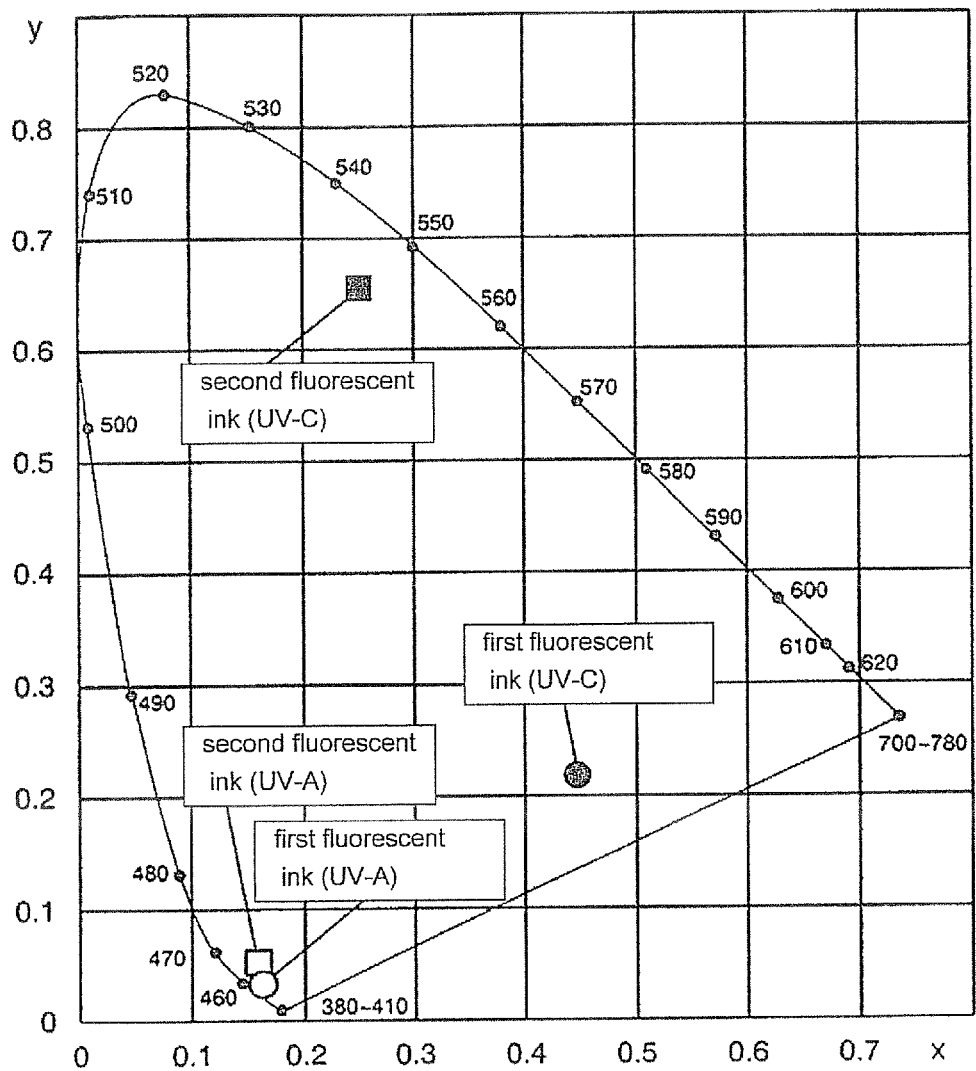
FIG. 5 is an xy chromaticity diagram showing chromaticities of fluorescent light emitted from the first fluorescent ink and chromaticities of fluorescent light emitted from the second fluorescent ink, in the first embodiment of the present invention.

Next, the first fluorescent ink 13 and the second fluorescent ink 14 are described in more detail with reference to FIGS. 4A to 5. FIG. 4A is a view showing a fluorescence emission spectrum of the first fluorescent ink 13, and FIG. 4B is a view showing a fluorescence emission spectrum of the second fluorescent ink 14. FIG. 5 is an xy chromaticity diagram showing, by means of an XYZ colorimetric system, chromaticities of light emitted from the first fluorescent ink 13 and chromaticities of fluorescent light emitted from the second fluorescent ink 14, when light within a specific wavelength range is irradiated.

(First Fluorescent Ink)

The first fluorescent ink 13 is firstly described. In FIG. 4A, the one-dot chain lines show the fluorescence emission spectrum of the first fluorescent ink 13, when ultraviolet light (invisible light) within a wavelength range of 315 to 400 nm (within a first wavelength range), i.e., so-called UV-A is irradiated. The solid line shows the fluorescence emission spectrum of the first fluorescent ink 13, when ultraviolet light (invisible light) within a wavelength range of 200 to 280 nm (within a second wavelength range), i.e., so-called UV-C is irradiated. Each fluorescence emission spectrum shown in FIG. 4A is normalized such that a peak intensity at the maximum peak is 1.

As shown in FIG. 4A, when the UV-A is irradiated, the first fluorescent ink 13 emits light having a peak wavelength $\lambda_{1A}$ of about 445 nm, which is light of blue color (first color). On the other hand, when the UV-C is irradiated, the first fluorescent ink 13 emits light having a peak wavelength $\lambda_{1C}$ of about 610 nm, which is light of red color (second color). Namely, the first fluorescent ink 13 contains a so-called dichromatic fluorescent material (first fluorescent material) which emits light of color which differs from when the UV-A is irradiated to when the UV-C is irradiated. Such a dichromatic fluorescent material can be obtained by suitably combining, e.g., a fluorescent material that is excited by the UV-A and a fluorescent material that is excited by the UV-C (see, for example, JP10-251570A).

As shown in FIG. 4A, when the UV-A is irradiated, light having a wavelength of about 610 nm is also emitted. However, the light having a wavelength of about 610 nm has an intensity that is smaller than an intensity of the light having a peak wavelength $\lambda_{1A}$ of about 445 nm. Thus, when the UV-A is irradiated, the light emitted from the first fluorescent ink 13 is viewed as light of blue color. Similarly, as shown in FIG. 4A, when the UV-C is irradiated, although the light having a wavelength of about 445 nm is emitted, since an intensity thereof is small, the light emitted from the first fluorescent ink 13 is viewed as light of red color.

(Second Fluorescent Ink)

Next, the second fluorescent ink 14 is described. In FIG. 4B, the one-dot chain lines show the fluorescence emission spectrum of the second fluorescent ink 14 when the UV-A is irradiated. The solid line shows the fluorescence emission spectrum of the second fluorescent ink 14 when the UV-C is irradiated. Similarly to the case shown in FIG. 4A, each fluorescence emission spectrum shown in FIG. 4B is normalized such that a peak intensity at the maximum peak is 1.

As shown in FIG. 4B, when the UV-A is irradiated, the second fluorescent ink 14 emits light having a peak wavelength $\lambda_{2A}$ of about 445 nm, which is light of blue color (first color), or light of a color that is viewed as the same color as the blue color (first color). On the other hand, when the UV-C is irradiated, the second fluorescent ink 14 emits light having a peak wavelength $\lambda_{2C}$ of about 525 nm, which is light of green color (third color). Namely, similarly to the first fluorescent ink 13, the second fluorescent ink 14 contains a so-called dichromatic fluorescent material (second fluorescent material) which emits light of color which differs from when the UV-A is irradiated to when the UV-C is irradiated.

As shown in FIG. 4B, when the UV-A is irradiated, light having a wavelength of about 525 nm is also emitted. However, the light having a wavelength of about 525 nm has an intensity that is smaller than an intensity of the light having a peak wavelength $\lambda_{2A}$ of about 445 nm. Thus, when the UV-A is irradiated, the light emitted from the second fluorescent ink 14 is viewed as light of blue color. Similarly, as shown in FIG. 4B, when the UV-C is irradiated, light having a wavelength of about 445 nm is also emitted. However, since an intensity thereof is small, the light from the second fluorescent ink 14 is viewed as light of green color.

Next, chromaticities of light emitted from the first fluorescent ink 13 and the second fluorescent ink 14 upon irradiation of the UV-A or the UV-C are described in more detail with reference to FIG. 5. As to symbols shown in FIG. 5, a blank circle represents a chromaticity of light emitted from the first fluorescent ink 13 upon irradiation of the UV-A, and a blank square represents a chromaticity of light emitted from the second fluorescent ink 14 upon irradiation of the UV-A. A black circle represents a chromaticity of light emitted from the first fluorescent ink 13 upon irradiation of the UV-C, and a black square represents a chromaticity of light emitted from the second fluorescent ink 14 upon irradiation of the UV-C.

The aforementioned blue color (first color) corresponds to the chromaticity represented by the blank circle shown in FIG. 5. The aforementioned red color (second color) corresponds to the chromaticity represented by the black circle shown in FIG. 5. The aforementioned green color (third color) corresponds to the black square in FIG. 5.

As shown in FIG. 5, in the xy chromaticity diagram, the chromaticity of the light emitted from the first fluorescent ink 13 upon irradiation of the UV-A and the chromaticity of the light emitted from the second fluorescent ink 14 upon irradiation of the UV-A are close to each other. Thus, as described above, the light emitted from the second fluorescent ink 14 when the UV-A is irradiated thereon is viewed as light of the same color as the light emitted from the first fluorescent ink 13 upon irradiation of the UV-A. Thus, the first pattern elements 20 formed with the use of the first fluorescent ink 13 and the second pattern elements 25 formed with the use of the second fluorescent ink 14 are viewed as micro-characters of the same color, upon irradiation of the UV-A. Thus, as described below, upon irradiation of the UV-A, all the micro-characters of the light-emitting image 12 are viewed as micro-characters of a unicolor (blue color), and thus the latent image of the first pattern elements 20 does not appear.

In addition, as shown in FIG. 5, in the xy chromaticity diagram, the chromaticity of the light emitted from the first fluorescent ink 13 upon irradiation of the UV-C and the chromaticity of the light emitted from the second fluorescent ink 14 upon irradiation of the UV-C are greatly distant from each other. Thus, the light emitted from the second fluorescent ink 14 when the UV-C is irradiated is viewed as light of a color that is different from the color of the light emitted from the first fluorescent ink 13 upon irradiation of the UV-C. Therefore, the first pattern elements 20 formed with the use of the first fluorescent ink 13 and the second pattern elements 25 formed with the use of the second fluorescent ink 14 are viewed as micro-characters of different colors, upon irradiation of the UV-C. As a result, as described below, when the UV-C is irradiated, the latent pattern of the first pattern elements 20 can be viewed.

In the present invention, the "same color" means that chromaticities of two colors are so close to each other that the difference in colors cannot be discriminated by the naked eye. To be more specific, the "same color" means that a color difference $\Delta E^*_{ab}$ between two colors is not more than 10, preferably not more than 3. The "different colors" means that the color difference $\Delta E^*_{ab}$ between the two colors is greater than 10. The color difference $\Delta E^*_{ab}$ is a value that is calculated based on L*, a* and b* in an L*a*b* colorimetric system, and is a value as a reference relating to a difference in colors when observed by the naked eye. L*, a* and b* in the L*a*b* colorimetric system and tristimulus values X, Y and Z in an XYZ colorimetric system are calculated based on a light spectrum and so on. There is a relationship according to a well-known transformation among L*, a* and b*, and the tristimulus values X, Y and Z.

The above tristimulus values can be measured by using, a measuring device such as a spectrophotometer, a differential colorimeter, a chromatometer, a colorimeter, a chromoscope, etc. Among these measuring devices, since the spectrophotometer can obtain a spectrum reflectance of each wavelength, the spectrophotometer can precisely measure the tristimulus values and thus is suited for analysis of color difference.

A procedure for calculating a color difference $\Delta E^*_{ab}$ is as follows. For example, light from a plurality of media (inks) to be compared is measured by the spectrophotometer in the first place, and then the tristimulus values X, Y and Z or L*, a* and b* are calculated based on the result. Thereafter, a color difference is calculated from differences $\Delta L^*$, $\Delta a^*$ and $\Delta b^*$ of L*, a* and b* in the plurality of media (inks), based on the following expression.

$$\Delta E^*_{ab} = [(\Delta L^*)^2 + (\Delta a^*)^2 + (\Delta b^*)^2]^{1/2} \quad \text{Expression 1}$$

Next, an operation of this embodiment as structured above is described. Herein, a method of manufacturing the anti-counterfeit medium 10 is firstly described. Then, there is described a method of examining whether a valuable paper made of the anti-counterfeit medium 10 is genuine or not.

Method of Manufacturing Anti-Counterfeit Medium

At first, the substrate 11 is prepared. As the substrate 11, there is used a 188-μm thick substrate made of white polyethylene terephthalate. Then, by using the first fluorescent ink 13 and the second fluorescent ink 14, the light-emitting image 12 composed of the first pattern elements 20 and the second pattern elements 25 is formed on the substrate 11.

At this time, as the first fluorescent ink 13 and the second fluorescent ink 14, there are used offset lithographic inks each of which is obtained by, for example, adding 8 wt % of microsilica, 2 wt % of organic bentonite, 50 wt % of alkyd resin and 15 wt % of alkyl benzene-based solvent, to 25 wt % of dichromatic fluorescent material having predetermined fluorescent properties. As the dichromatic material (first fluorescent material) for the first fluorescent ink 13, there is used a fluorescent material DE-RB (manufactured by Nemoto & Co., Ltd.) which emits light of red color when being excited by ultraviolet light having a wavelength of 254 nm, and emits light of blue color when being excited by ultraviolet light having a wavelength of 365 nm. As the dichromatic material (second fluorescent material) for the second fluorescent ink 14, there is used a fluorescent material DE-GB (manufactured by Nemoto & Co., Ltd.) which emits light of green color when being excited by ultraviolet light having a wavelength of 254 nm, and emits light of blue color when being excited by ultraviolet light having a wavelength of 365 nm.

The dichromatic fluorescent materials of the first and second fluorescent inks 13 and 14 are respectively selected such that, when ultraviolet light having a wavelength of 365 nm is irradiated, a color difference $\Delta E^*_{ab}$ between the light of blue color emitted from the first fluorescent ink 13 and the light of blue color emitted from the second fluorescent ink 14 is not more than 10, preferably not more than 3. In general, the color difference $\Delta E^*_{ab}$ of about 3 is a limit of recognition ability of the human eye, i.e., ability of discriminating colors. Thus, when the color difference $\Delta E^*_{ab}$ is not more than 3, it becomes more difficult to discriminate colors by the naked eye, whereby the pattern of the light-emitting image 12 for authenticity judgment can be prevented from being easily found out.

The composition of the respective constituent elements of the first fluorescent ink 13 and the second fluorescent ink 14 is not limited to the aforementioned composition, and an optimum composition can be set according to properties required for the anti-counterfeit medium 10.

Confirmation Method

Next, a method of examining (confirming) whether a valuable paper made of the anti-counterfeit medium 10 is genuine or not is described with reference to FIGS. 2, 6A and 6B.

(Case of Irradiating Visible Light)

At first, the anti-counterfeit medium 10 is observed under visible light. In this case, as described above, the substrate 11, the first pattern elements 20 of the light-emitting image 12 and the second pattern elements 25 thereof are respectively viewed as areas of white color (see FIG. 2). Thus, under the visible light, the latent image of the first pattern elements 20 of the light-emitting image 12 does not appear.

(Case of Irradiation of UV-A)

Then, the anti-counterfeit medium 10 when the UV-A is irradiated thereon is observed. As the UV-A to be irradiated, ultraviolet light having a wavelength of 365 nm is used, for example.

FIG. 6A is a plan view showing the light-emitting image 12 of the anti-counterfeit medium 10, when the UV-A is irradiated thereon. Since the first fluorescent ink 13 forming the first pattern elements 20 contains the fluorescent material DE-RB, the first fluorescent ink 13 emits light of blue color. Thus, the first pattern elements 20 are viewed as blue portions 21b. On the other hand, since the second fluorescent ink 14 forming the second pattern elements 25 contains the fluorescent material DE-GB, the second fluorescent ink 14 emits light of blue color. Thus, the second pattern elements 25 are also viewed as blue portions 26b. Namely, when the UV-A is irradiated, the first pattern elements 20 and the second pattern elements 25 are viewed as micro-characters of the same color. Thus, when the UV-A is irradiated, the latent image of the first pattern elements 20 of the light-emitting image 12 is buried in the micro-character rows m, and does not appear.

(Case of Irradiation of UV-C)

Then, the anti-counterfeit medium 10 when the UV-C is irradiated thereon is observed. As the UV-C to be irradiated, ultraviolet light having a wavelength of 254 nm is used, for example.

FIG. 6B is a plan view showing the light-emitting image 12 of the anti-counterfeit medium 10, when the UV-C is irradiated thereon. Since the first fluorescent ink 13 forming the first pattern elements 20 contains the fluorescent material DE-RB, the first fluorescent ink 13 emits light of red color. Thus, the first pattern elements 20 are viewed as red portions 21c. On the other hand, since the second fluorescent ink 14 forming the second pattern elements 25 contains the fluorescent material DE-GB, the second fluorescent ink 14 emits light of green color. Thus, the second pattern elements 25 are viewed as green portions 26c. Namely, when the UV-C is irradiated, the first pattern elements 20 and the second pattern elements 25 are viewed as micro-characters of different colors. Thus, when the UV-C is irradiated, the latent image in the micro-character rows m, which is composed of the first pattern elements 20 of the light-emitting image 12, appears and thus can be viewed. As described above, the latent image of the character "A" is viewed herein.

When the visible light, the UV-A and UV-C are irradiated, by examining whether the colors of the first pattern elements 20 and the second pattern elements 25 change in the manner as described above, whether the valuable paper made of the anti-counterfeit medium 10 is genuine or not can be confirmed.

According to this embodiment, the anti-counterfeit medium 10 includes the substrate 11, the plurality of first pattern elements 20 formed on the substrate 11 by using the first fluorescent ink 13 containing the first fluorescent material, and the plurality of second pattern elements 25 formed on the substrate 11 by using the second fluorescent ink 14 containing the second fluorescent material. The first pattern elements 20 and the second pattern elements 25 form the plurality of micro-characters of "D", "N" and "P". The micro-characters form the plurality of micro-character rows m, and the first pattern elements 20 form the latent image in the micro-character rows m. The first fluorescent material of the first fluorescent ink 13 is made of the fluorescent material DE-RB which emits light of blue color (first color) when the UV-A is irradiated, and emits light of red color (second color) when the UV-C is irradiated. Meanwhile, the second fluorescent material of the second fluorescent ink 14 is made of the fluorescent material DE-GB which emits light of blue color (first color) or light of a color that is viewed as the same color as the blue color (first color) when the UV-A is irradiated, and emits light of green color (third color) when the UV-C is irradiated. Thus, the first pattern elements 20 and the second pattern elements 25 cannot be discriminated when the UV-A is irradiated. It is not until the UV-C is irradiated that the first pattern elements 20 and the second pattern elements 25 can be discriminated. Namely, when the UV-A is irradiated, the latent image of the first pattern elements 20 is buried in the micro-character rows m, and thus cannot be viewed. It is not until the UV-C is irradiated that the latent image of the first pattern elements 20 appears in the micro-character rows m, and thus can be viewed.

In this manner, by forming the first pattern elements 20 and the second pattern elements 25 with the use of inks containing the dichromic fluorescent materials, forging of the anti-counterfeit medium 10 can be made more difficult as compared with a case in which an ink containing a monochromatic fluorescent material is used. In addition, whether the light-emitting image 12 is genuine or not can be easily and promptly judged by the naked eye.

In addition, by selecting the first fluorescent material of the first fluorescent ink 13 and the second fluorescent material of the second fluorescent ink 14 such that the first fluorescent ink 13 and the second fluorescent ink 14 emit light of the same color or light of colors that are viewed as the same color, when the UV-A is irradiated, the latent image of the light-emitting image 12 can be prevented from being easily found out. Therefore, forging of the anti-counterfeit medium 10 can be made furthermore difficult.

In addition, since preparation of a light source of the UV-C is more difficult than that of UV-A, by selecting the first fluorescent material and the second fluorescent material of the first fluorescent ink 13 and the second fluorescent ink 14 such that it is not until the UV-C is irradiated that the latent image of the first pattern elements 20 appears, the latent image of the first pattern elements 20 can be more securely prevented from being found out. Therefore, forging of the anti-counterfeit medium 10 can be made furthermore difficult.

Moreover, since the first pattern elements 20 and the second pattern elements 25 form the plurality of micro-character rows m, surfaces areas of the first pattern elements 20 and the second pattern elements 25 are smaller than a surface area of the light-emitting image 12. In addition, the first pattern element 20 and the second pattern element 25 have the complicated shapes. Thus, even when there is a slight color difference or a thickness difference between the first pattern element 20 and the second pattern element 25, the latent image of the first pattern elements 20 is difficult to be viewed, upon irradiation of the UV-A. That is to say, the latent image of the light-emitting image 12 can be prevented from being easily found out. Therefore, forging of the anti-counterfeit medium 10 can be made furthermore difficult.

In addition, in this embodiment, there is no portion where the first pattern element 20 and the second pattern element 25 are in contact with each other. Namely, when the UV-A is irradiated, there is no portion where the blue portion 21b of the first pattern element 20 and the blue portion 26b of the second pattern element 25 are in contact with each other. Assuming that the blue portion 21b and the blue portion 26b are in contact with each other. In this case, there is a possibility that light which is randomly reflected or refracted exits at the portion where the blue portion 21b and the blue portion 26b are in contact with each other. However, according to this embodiment, there is no possibility that the boundary between the blue portion 21b and the blue portion 26b is viewed as a result of such light. Therefore, the latent image of the first pattern elements 20 can be more securely prevented from being found out.

Comparative Example

A comparative example in which a micro-character is not used is described.

Figure 7:
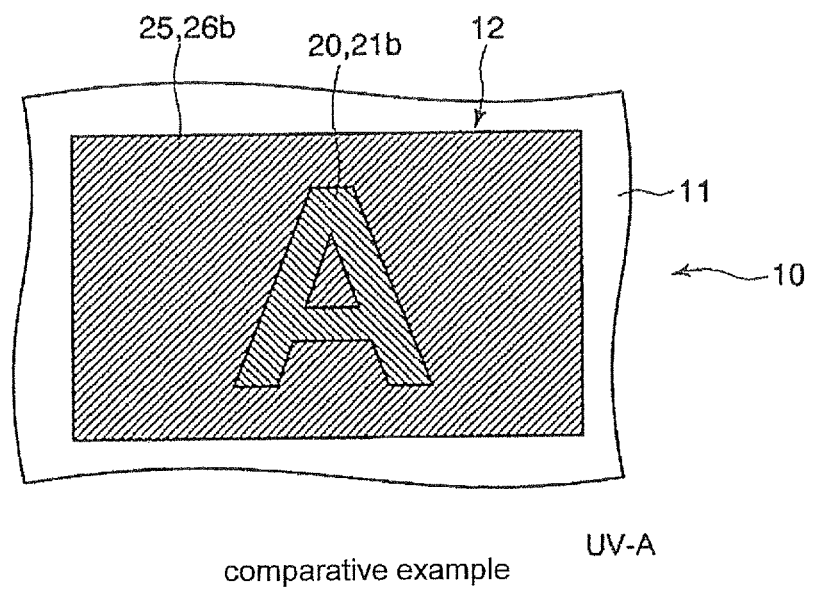
FIG. 7 is a plan view showing a light-emitting image when the UV-A is irradiated thereon, in a comparative example.

FIG. 7 is a plan view showing the light-emitting image 12 of the anti-counterfeit medium 10 upon irradiation of the UV-A, in the comparative example. In this anti-counterfeit medium 10, the first pattern element 20 of the light-emitting image 12 and a background area thereof as the second pattern element 25 are formed by solid-printing, on a substrate 11, the first fluorescent ink 13 containing the first fluorescent material and the second fluorescent ink 14 containing the second fluorescent material. The first pattern element 20 is formed of a character "A", and the second pattern element 25 is formed to surround the first pattern element 20. Upon irradiation of the UV-A, the first pattern element 20 is viewed as a blue portion 21b. The second pattern element 25 is also viewed as a blue portion 26b. However, when there is a slight color difference between the blue portion 21b and the blue portion 26b, the character "A" is undesirably viewed.

Modification Example

In this embodiment, the one micro-character is formed by the one first pattern element 20 or the one second pattern element 25. However, not limited thereto, the one micro-character may include both the first pattern element 20 and the second pattern element 25. Herebelow, there is described an example in which one micro-character includes the first pattern element 20 and the second pattern element 25, with reference to FIGS. 8A to 9B.

Figure 8A:
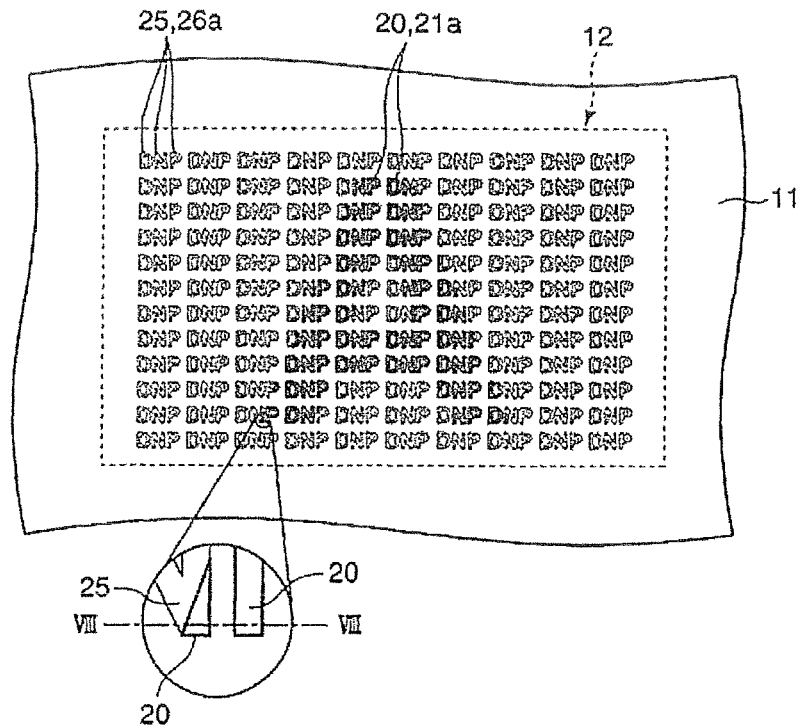
FIG. 8A is a plan view showing the light-emitting image of the anti-counterfeit medium in a modification example of the first embodiment of the present invention.
Figure 8B:
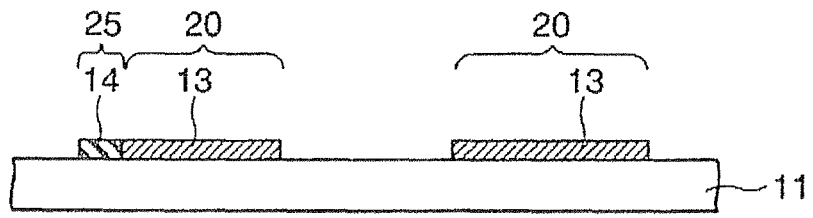
FIG. 8B is a sectional view taken along a line VIII-VIII of the light-emitting image shown in FIG. 8A.

FIG. 8A is a plan view showing the light-emitting image 12 of the anti-counterfeit medium 10 under visible light, in this modification example. FIG. 8B is a sectional view taken along a line VIII-VIII of the light-emitting image 12 shown in FIG. 8A. As shown in FIGS. 8A and 8B, in this modification example, the plurality of micro-characters have some micro-characters each of which is composed of the first pattern element 20 and the second pattern element 25.

Next, a method of examining whether a valuable paper made of the anti-counterfeit medium 10 is genuine or not in this modification example is described with reference to FIGS. 8A, 9A and 9B.

(Case of Irradiation of Visible Light)
Under visible light, as shown in FIG. 8A, the first pattern elements 20 and the second pattern elements 25 are formed of the white portions 21a and 26a. Thus, under the visible light, the latent image of the first pattern elements 20 of the light-emitting image 12 does not appear.

Figure 9A:
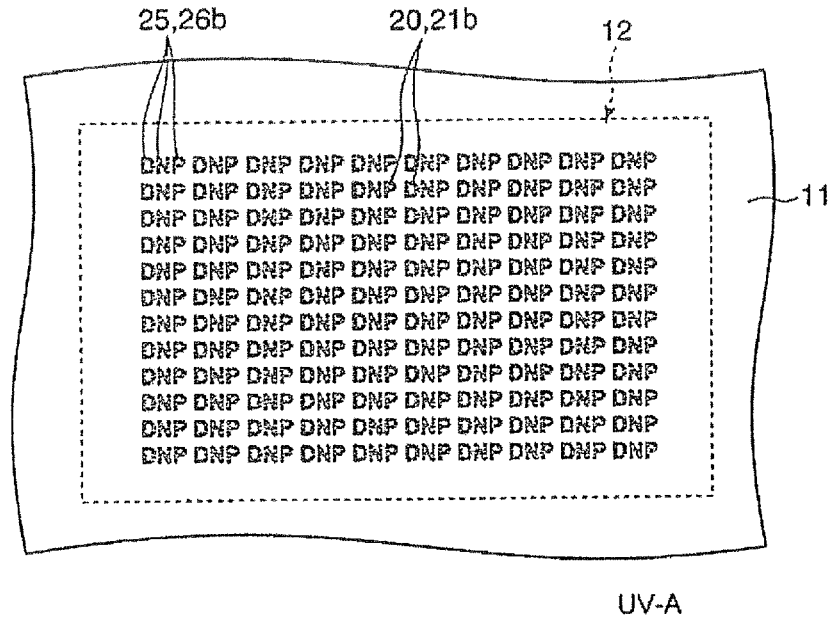
FIG. 9A is a plan view showing the light-emitting image when the UV-A is irradiated thereon, in the modification example of the first embodiment of the present invention.

(Case of Irradiation of UV-A)
FIG. 9A is a plan view showing the light-emitting image 12 of the anti-counterfeit medium 10 when the UV-A is irradiated thereon. The first pattern elements 20 and the second pattern elements 25 are formed of the blue portions 21b and 26b, respectively. Thus, when the UV-A is irradiated, the latent image of the first pattern elements 20 of the light-emitting image 12 does not appear.

Figure 9B:
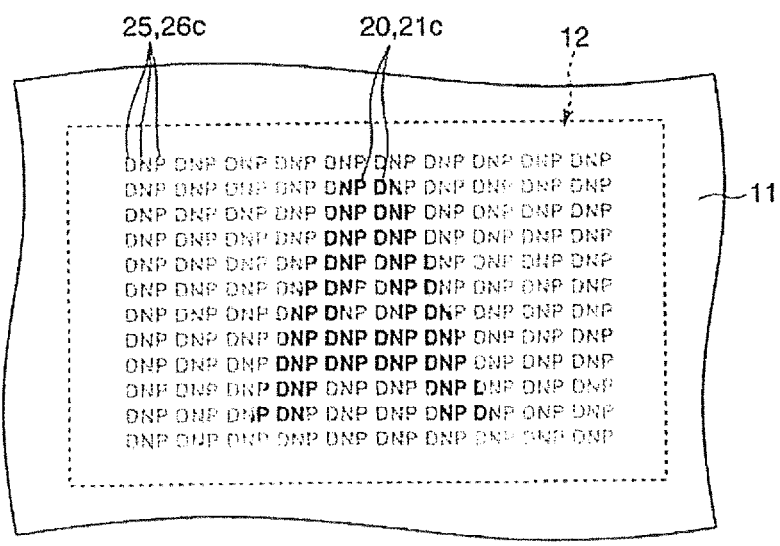
FIG. 9B is a plan view showing the light-emitting image when the UV-C is irradiated thereon, in the modification example of the first embodiment of the present invention.

(Case of Irradiation of UV-C)
FIG. 9B is a plan view showing the light-emitting image 12 of the anti-counterfeit medium 10 when UV-C is irradiated thereon. The first pattern elements 20 and the second pattern elements 25 are formed of the red portions 21c and the green portions 26c, respectively. Thus, when the UV-C is irradiated, the latent image of the first pattern elements 20 of the light-emitting image 12 can be viewed.

According to this modification example, since the plurality of micro-characters have some micro-characters each of which is composed of the first pattern element 20 and the second pattern element 25, the latent image of the first pattern elements 20, which has a smoother contour than that of the first embodiment, can be viewed upon irradiation of the UV-C. Thus, upon irradiation of the UV-C, the shape of the latent image can be more easily recognized.

Moreover, the same effects as those of the first embodiment can be obtained.

Another Modification Example

In this embodiment, there is described the example in which an ink containing the fluorescent material DE-RB is used as the first fluorescent ink 13 and an ink containing the fluorescent material DE-GB is used as the second fluorescent ink 14. Namely, there is described the example in which inks of a combination_1 shown in the below Table 1 are used.

However, not limited thereto, inks of a combination_2 or inks of combination_3 in Table 1 may be used as the first fluorescent ink 13 and the second fluorescent ink 14. Similarly to the case of the combination_1, in the case of the combination_2 or the combination_3, the first fluorescent ink 13 and the second fluorescent ink 14 are inks which emit light of the same color or light of colors that are viewed as the same color when the UV-A is irradiated. Therefore, the latent image of the light-emitting image 12 can be prevented from being easily found out, whereby forging of the anti-counterfeit medium 10 can be made more difficult.

In Table 1, the colors in the "UV-A" column or in the "UV-C" column respectively means colors of light emitted from the first fluorescent ink 13 and the second fluorescent ink 14 when the UV-A or the UV-C is irradiated. The names described in the "fluorescent material" column represent product names of Nemoto & Co., Ltd. In the product name "DE-$X_1X_2$", $X_1$ means a color of light emitted upon irradiation of the UV-C, and $X_2$ means a color of light emitted upon irradiation of the UV-A. For example, the fluorescent material DE-GR is a fluorescent material which emits light of green color upon irradiation of UV-C and emits light of red color upon irradiation of UV-A.

TABLE 1

| Combination | | UV-A | UV-C | Fluorescent Material |
|---|---|---|---|---|
| 1 | First Fluorescent Ink | Blue Color | Red Color | DE-RB |
|   | Second Fluorescent Ink | Blue Color | Green Color | DE-GB |
| 2 | First Fluorescent Ink | Red Color | Green Color | DE-GR |
|   | Second Fluorescent Ink | Red Color | Blue Color | DE-BR |
| 3 | First Fluorescent Ink | Green Color | Blue Color | DE-BG |
|   | Second Fluorescent Ink | Green Color | Red Color | DE-RG |

In this embodiment, the first pattern elements 20 are formed by using the first fluorescent ink 13 and the second pattern elements are formed by using the second fluorescent ink 14. However, not limited thereto, the first pattern elements 20 may be formed by using the second fluorescent ink 14 and the second pattern elements 25 may be formed by using the first fluorescent ink 13. Also in this case, the latent image of the first pattern elements 20 cannot be viewed when the UV-A is irradiated, and it is not until the UV-C is irradiated that the latent image of the first pattern elements 20 can be viewed. Therefore, forging of the anti-counterfeit medium 10 can be made difficult.

Second Embodiment

Next, a second embodiment of the present invention is described with reference to FIGS. 10 to 11B. The second embodiment shown in FIGS. 10 to 11B differs from the first embodiment shown in FIGS. 1 to 9B only in that the second fluorescent ink 14 is made of an ink that does not emit light when the UV-C is irradiated. The other structures are substantially the same as the aforementioned first embodiment. In the second embodiment shown in FIGS. 10 to 11B, the same parts as those of the first embodiment are shown by the same reference numbers, and description thereof is omitted.

(Second Fluorescent Ink)

The second fluorescent ink 14 in this embodiment is firstly described with reference to FIG. 10. In FIG. 10, the one-dot chain lines show a fluorescent emission spectrum of the second fluorescent ink 14 when the UV-A is irradiated, and the solid line shows a fluorescent emission spectrum of the second fluorescent ink 14 when the UV-C is irradiated. In FIG. 10, an intensity at a peak of the spectrum (solid line) upon irradiation of the UV-C is shown as a relative intensity, on the assumption that a peak intensity at a maximum peak of the spectrum (one-dot chain lines) upon irradiation of UV-A is 1.

Figure 10:
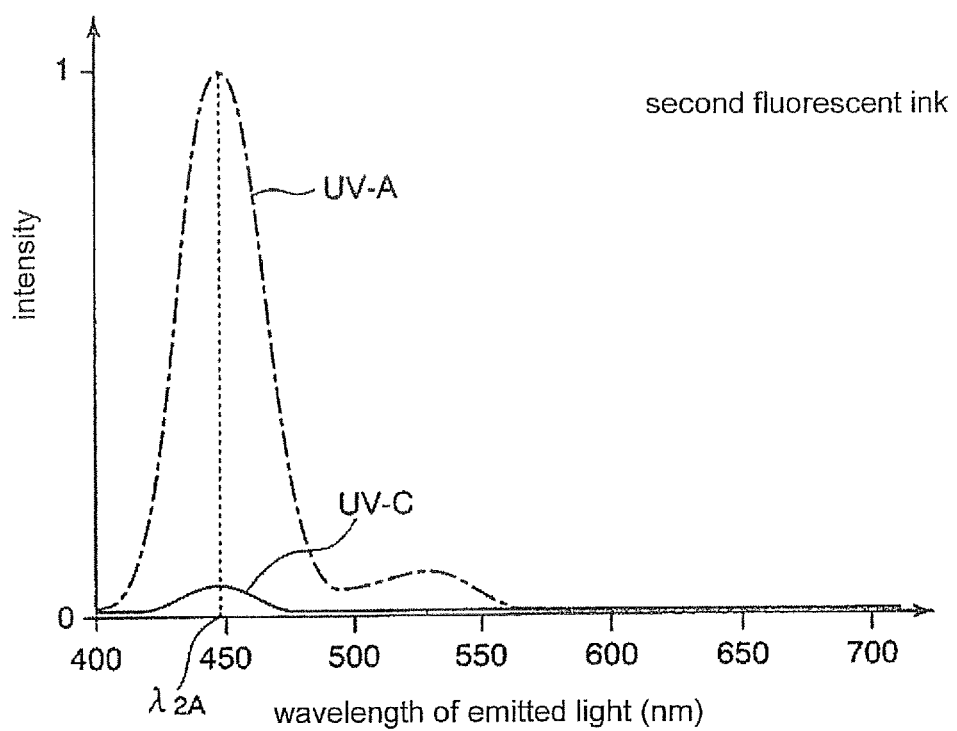
FIG. 10 is a view showing a fluorescence emission spectrum of a second fluorescent ink, in the second embodiment of the present invention.

As shown in FIG. 10, the second fluorescent ink 14 emits light having a peak wavelength $\lambda_{2A}$ of about 445 nm, which is light of blue color (first color) or light of a color that is viewed as the same color as the blue color (first color). When the UV-C is irradiated, the second fluorescent ink 14 emits light having a wavelength of about 445 nm whose intensity is significantly smaller than the peak intensity upon irradiation of the UV-A. Thus, because of this significantly small intensity, the light emitted from the second fluorescent ink 14 upon irradiation of the UV-C cannot be almost perceived by the naked eye. As a result, the second fluorescent ink 14 upon irradiation of the UV-C is viewed as an achromatic ink. Namely, in this embodiment, the second fluorescent material contained in the second fluorescent ink 14 is a monochromatic fluorescent ink which emits light only when the UV-A is irradiated.

In this embodiment, the term "achromatic" means that a color viewed when the second fluorescent ink 14 is observed is determined by an element that is other than a color of light emitted from the second fluorescent ink 14 itself. For example, when only the UV-C is irradiated on the second fluorescent ink 14, the second fluorescent ink 14 is viewed as an ink of black color. On the other hand, when the UV-C and the visible light are irradiated on the second fluorescent ink 14, since the visible light is scattered by the pigment particles in the second fluorescent ink 14, the second fluorescent ink 14 is viewed as an ink of white color, as described above.

In the present invention, the expression "not emit light when the UV-C is irradiated" means a concept including not only a case in which there is emitted no light when the UV-C is irradiated, but also a case in which there is emitted light whose intensity is so small that it cannot be perceived as light of certain color by the naked eye, which is shown by the solid line in FIG. 10.

Next, an operation of this embodiment as structured above is described. Herein, a method of manufacturing the anti-counterfeit medium 10 is described at first. Then, there is described a method of examining examining whether a valuable paper made of the anti-counterfeit medium 10 is genuine or not.

Method of Manufacturing Anti-Counterfeit Medium

At first, the substrate 11 is prepared. As the substrate 11, there is used a 188-μm thick substrate made of white polyethylene terephthalate. Then, with the use of the first fluorescent ink 13 and the second fluorescent ink 14, the light-emitting image 12 composed of the first pattern elements 20 and the second pattern elements 25 is formed on the substrate 11.

Since the first fluorescent ink 13 to be used herein is the same as the first fluorescent ink 13 in the first embodiment shown in FIGS. 1 to 9B, detailed description thereof is omitted. As the second fluorescent ink 14, there is used an offset lithographic ink which is obtained by adding 8 wt % of microsilica, 2 wt % of organic bentonite, 50 wt % of alkyd resin and 15 wt % of alkyl benzene-based solvent, to 25 wt % of monochromatic fluorescent material having predetermined fluorescent properties. As the monochromatic material (second fluorescent material) of the second fluorescent ink 14, there is used a fluorescent material D-1184 (manufactured by Nemoto & Co., Ltd.) which emits light of blue color when ultraviolet light having a wavelength of 365 nm is irradiated.

Confirmation Method

Next, a method of examining (confirming) whether a valuable paper made of the anti-counterfeit medium 10 is genuine or not is described with reference to FIGS. 11A and 11B.

(Case of Irradiation of UV-A)

Figure 11A:
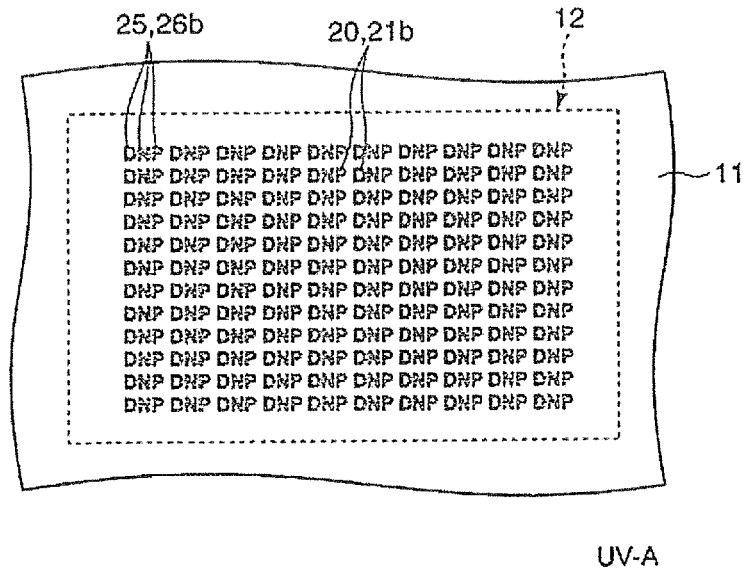
FIG. 11A is a plan view showing the light-emitting image when the UV-A is irradiated thereon, in the second embodiment of the present invention.

FIG. 11A is a plan view showing the light-emitting image 12 of the anti-counterfeit medium 10, when the UV-A is irradiated thereon. Since the first fluorescent ink 13 forming the first pattern elements 20 contains the fluorescent material DE-RB, the first fluorescent ink 13 emits light of blue color. Thus, the first pattern elements 20 are viewed as the blue portions 21b. On the other hand, since the second fluorescent ink 14 forming the second pattern elements 25 contains the fluorescent material D-1184, the second fluorescent ink 14 emits light of blue color. Thus, the second pattern elements 25 are also viewed as the blue portions 26b. Namely, upon irradiation of the UV-A, the first pattern elements 20 and the second pattern elements 25 are viewed as micro-characters of the same color. Thus, when the UV-A is irradiated, the latent image of the first pattern elements 20 of the light-emitting image 12 does not appear.

(Case of Irradiation of UV-C)

Figure 11B:
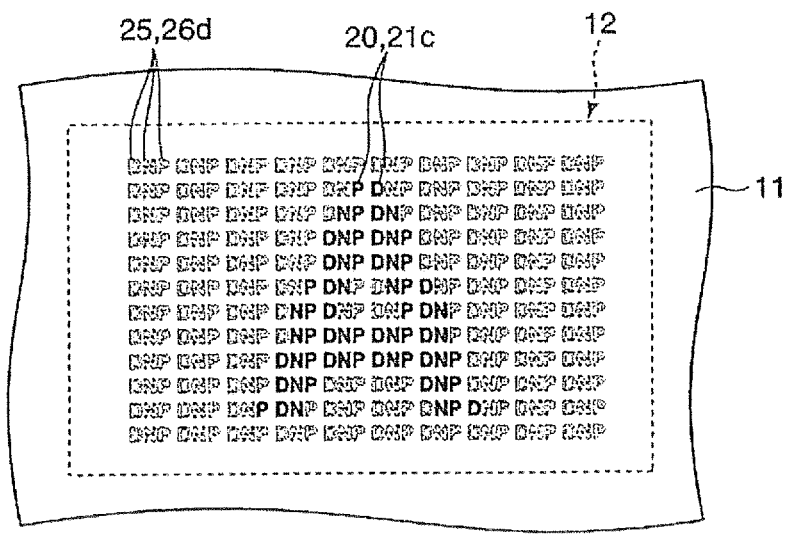
FIG. 11B is a plan view showing the light-emitting image when the UV-C is irradiated thereon, in the second embodiment of the present invention.

FIG. 11B is a plan view showing the light-emitting image 12 of the anti-counterfeit medium 10, when the UV-C is irradiated thereon. Since the first fluorescent ink 13 forming the first pattern elements 20 contains the fluorescent material DE-RB, the first fluorescent ink 13 emits light of red color. Thus, the first pattern elements 20 are viewed as the red portions 21c. On the other hand, since the second fluorescent ink 14 forming the second pattern elements 25 is made of the ink that does not emit light upon irradiation of the UV-C, the second pattern elements 25 are viewed as achromatic portions 26d. Thus, when the UV-C is irradiated, the latent image of the first pattern elements 20 of the light-emitting image 12 can be viewed.

Although FIG. 11B shows the lines defining the micro-characters of "D", "N" and "P" of the second pattern elements 25, these micro-characters are not viewed actually.

According to this embodiment, the anti-counterfeit medium 10 includes the substrate 11, the plurality of first pattern elements 20 formed on the substrate 11 by using the first fluorescent ink 13 containing the first fluorescent material, and the plurality of second pattern elements 25 formed on the substrate 11 by using the second fluorescent ink 14 containing the second fluorescent material. The first pattern elements 20 and the second pattern elements 25 form a plurality of micro-characters of "D", "N" and "P". The micro-characters form the plurality of micro-character rows m, and the first pattern elements 20 form the latent image in the micro-character rows m. The first fluorescent material of the first fluorescent ink 13 is made of the fluorescent material DE-RB which emits light of blue color (first color) when the UV-A is irradiated, and emits light of red color (second color) when the UV-C is irradiated. Meanwhile, the second fluorescent material of the second fluorescent ink 14 is made of the fluorescent material D-1184 which emits light of blue color (first color) or light of a color that is viewed as the same color as the blue color (first color) when the UV-A is irradiated, and does not emit light when the UV-C is irradiated. Thus, the first pattern elements 20 and the second pattern elements 25 cannot be discriminated when the UV-A is irradiated. It is not until the UV-C is irradiated that the first pattern elements 20 and the second pattern elements 25 can be discriminated.

Namely, when the UV-A is irradiated, the latent image of the first pattern elements 20 is buried in the micro-character rows m, and thus cannot be viewed. It is not until the UV-C is irradiated that the latent image of the first pattern elements 20 appears in the micro-character rows m and thus can be viewed.

In this manner, by forming the first pattern elements 20 with the use of the ink containing the dichromic fluorescent material which emits light of a color which differs depending on a wavelength of light to be irradiated, forging of the anti-counterfeit medium 10 can be made difficult. In addition, whether the light-emitting image 12 is genuine or not can be easily and promptly judged by the naked eye.

In addition, by selecting the first fluorescent material of the first fluorescent ink 13 and the second fluorescent material of the second fluorescent ink 14 such that the first fluorescent ink 13 and the second fluorescent ink 14 emit light of the same color or light of colors that are viewed as the same color when the UV-A is irradiated, the latent image of the light-emitting image 12 can be prevented from being easily found out. Therefore, forging of the anti-counterfeit medium 10 can be made more difficult.

In addition, since preparation of a light source of the UV-C is more difficult than that of UV-A, by selecting the first fluorescent material and the second fluorescent material of the first fluorescent ink 13 and the second florescent ink 14 such that it is not until the UV-C is irradiated that the latent image of the first pattern elements 20 appears, the latent image of the first pattern elements 20 can be more securely prevented from being found out. Therefore, forging of the anti-counterfeit medium 10 can be made furthermore difficult.

Moreover, the same effects as those of the first embodiment can be obtained.

Modification Example

In this embodiment, there is described the example in which an ink containing the fluorescent material DE-RB is used as the first fluorescent ink 13, and an ink containing the fluorescent material D-1184 is used as the second fluorescent ink 14. Namely, the use of inks of a combination_1 in the below Table 2 is shown by way of example. However, not limited thereto, inks of a combination_2 to a combination_6 in Table 2 may be used as the first fluorescent ink 13 and the second fluorescent ink 14. Similarly to the combination_1, the first fluorescent ink 13 and the second fluorescent ink 14 in the combination_2 to the combination_6 are inks that emit light of the same color or light of colors that are viewed as the same color when the UV-A is irradiated. Thus, the latent image of the light-emitting image 12 can be prevented from being easily found out, whereby forging of the anti-counterfeit medium 10 can be made more difficult.

In Table 2, the term "achromatic color" in the "UV-C" column means that no light is emitted. The names described in the "fluorescent material" column represent product names of Nemoto & Co., Ltd.

TABLE 2

| Combination | | UV-A | UV-C | Fluorescent Material |
|---|---|---|---|---|
| 1 | First Fluorescent Ink | Blue Color | Red Color | DE-RB |
|   | Second Fluorescent Ink | Blue Color | Achromatic Color | D-1184 |

TABLE 2-continued

| Combination | | UV-A | UV-C | Fluorescent Material |
|---|---|---|---|---|
| 2 | First Fluorescent Ink | Blue Color | Green Color | DE-GB |
| | Second Fluorescent Ink | Blue Color | Achromatic Color | D-1184 |
| 3 | First Fluorescent Ink | Red Color | Green Color | DE-GR |
| | Second Fluorescent Ink | Red Color | Achromatic Color | D-1120 |
| 4 | First Fluorescent Ink | Red Color | Blue Color | DE-BR |
| | Second Fluorescent Ink | Red Color | Achromatic Color | D-1120 |
| 5 | First Fluorescent Ink | Green Color | Blue Color | DE-BG |
| | Second Fluorescent Ink | Green Color | Achromatic Color | D-1150 |
| 6 | First Fluorescent Ink | Green Color | Red Color | DE-RG |
| | Second Fluorescent Ink | Green Color | Achromatic Color | D-1150 |

In this embodiment, the first pattern elements 20 are formed by using the first fluorescent ink 13 and the second pattern elements are formed by using the second fluorescent ink 14. However, not limited thereto, the first pattern elements 20 may be formed by using the second fluorescent ink 14 and the second pattern elements 25 may be formed by using the first fluorescent ink 13. Also in this case, the latent image of the first pattern elements 20 cannot be viewed when the UV-A is irradiated, and it is not until the UV-C is irradiated that the latent image of the first pattern elements 20 can be viewed. Therefore, forging of the anti-counterfeit medium 10 can be made difficult.

Third Embodiment

Next, a third embodiment of the present invention is described with reference to FIGS. 12A to 14B. The third embodiment shown in FIGS. 12A to 14B differs from the first embodiment shown in FIGS. 1 to 9B only in that the first fluorescent ink and the second fluorescent ink are selected such that the first fluorescent ink and the second fluorescent ink emit light of the same color or light of colors that are viewed as the same color when the UV-C is irradiated. The other structures are substantially the same as the aforementioned first embodiment. In the third embodiment shown in FIGS. 12A to 14B, the same parts as those of the first embodiment are shown by the same reference numbers, and description thereof is omitted.

Fluorescent Inks

Figure 12A:
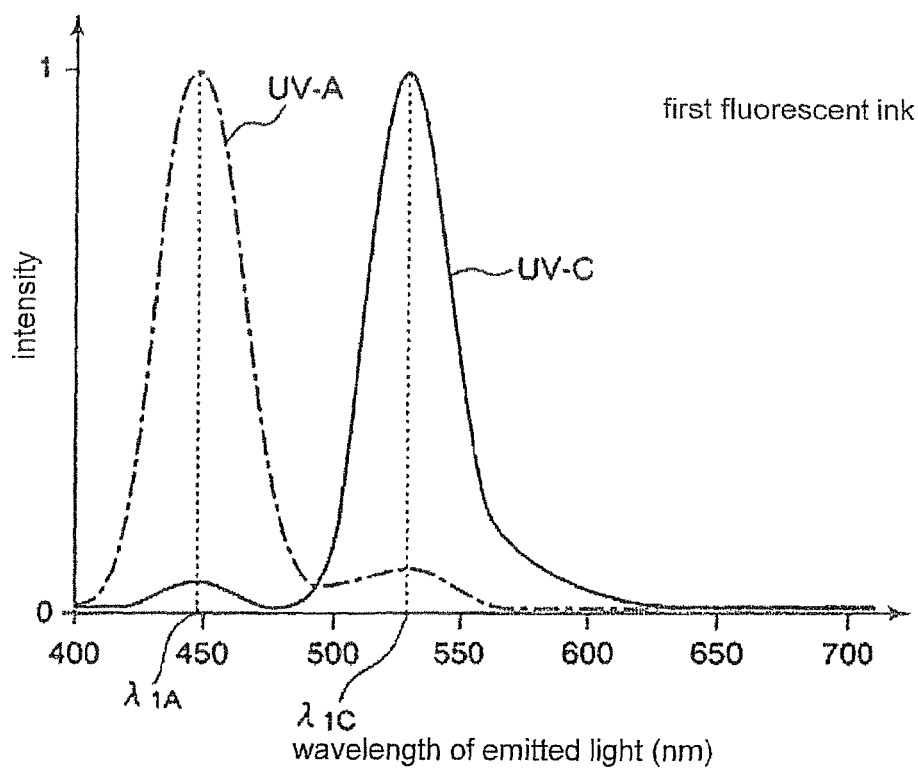
FIG. 12A is a view showing a fluorescence emission spectrum of the first fluorescent ink in a third embodiment of the present invention.
Figure 12B:
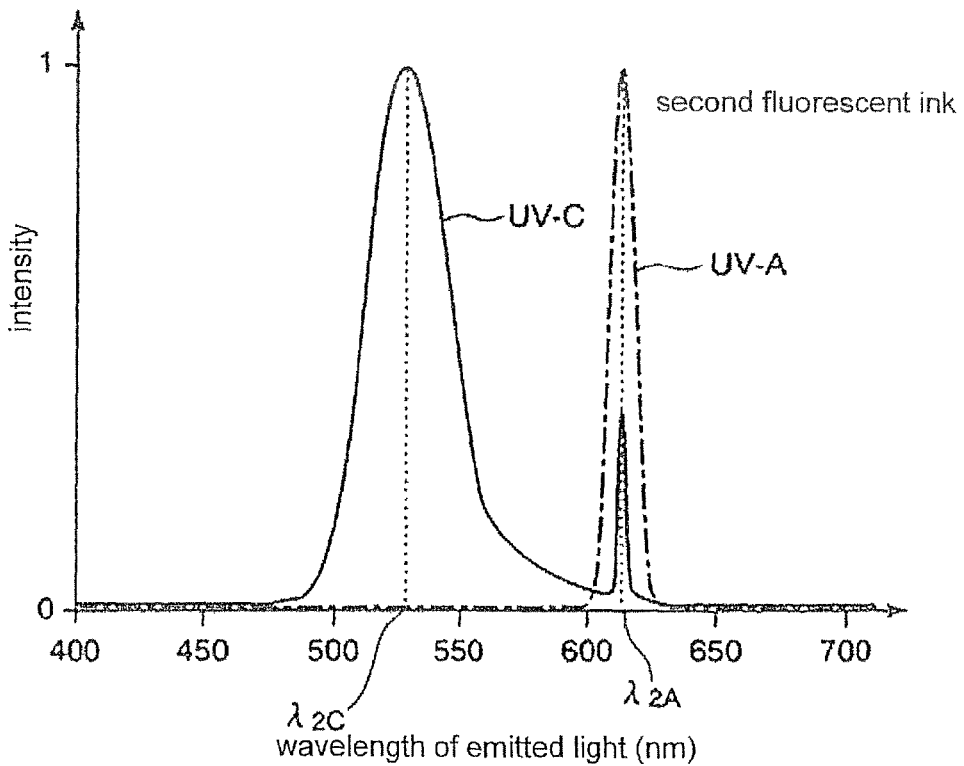
FIG. 12B is a view showing a fluorescence emission spectrum of the second fluorescent ink in the third embodiment of the present invention.
Figure 13:
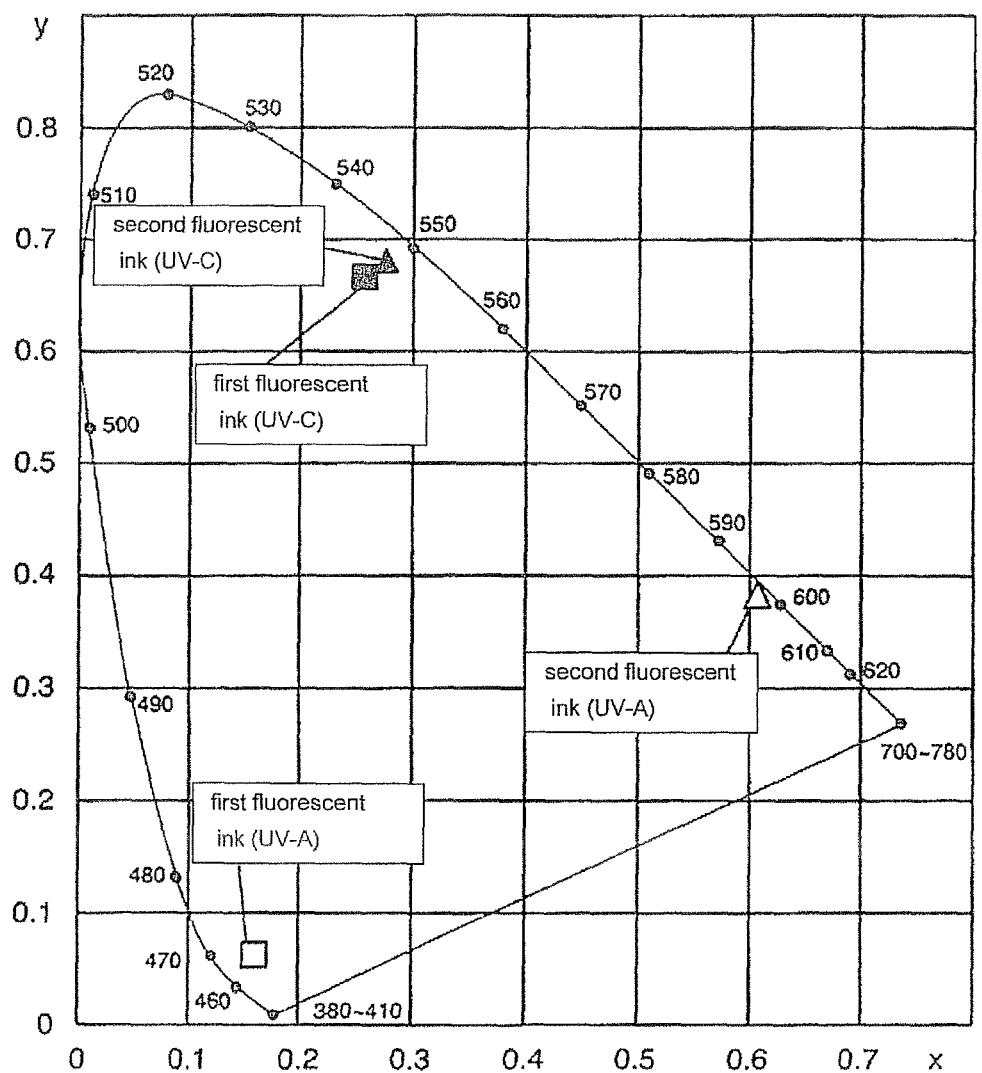
FIG. 13 is an xy chromaticity diagram showing chromaticities of fluorescent light emitted from the first fluorescent ink and chromaticities of light emitted from the second fluorescent ink, in the third embodiment of the present invention.

The first fluorescent ink 13 and the second fluorescent ink 14 in this embodiment are firstly described in detail, with reference to FIGS. 12A to 13. FIG. 12A is a view showing a fluorescence emission spectrum of the first fluorescent ink 13, and FIG. 12B is a view showing a fluorescent emission spectrum of the second fluorescent ink 14. FIG. 13 is an xy chromaticity diagram showing, by means of an XYZ colorimetric system, chromaticities of fluorescent light emitted from the first fluorescent ink 13 and chromaticities of fluorescent light emitted from the second fluorescent ink 14, when light within a specific wavelength range is irradiated.

(First Fluorescent Ink)

The first fluorescent ink 13 is firstly described. In FIG. 12A, the one-dot chain lines show the fluorescence emission spectrum of the first fluorescent ink 13, when UV-A (invisible light within a second wavelength range) is irradiated. The solid line shows the fluorescence emission spectrum of the first fluorescent ink 13, when UV-C (invisible light within a first wavelength range) is irradiated. Each fluorescence emission spectrum shown in FIG. 12A is normalized such that a peak intensity at the maximum peak is 1.

As shown in FIG. 12A, when the UV-C is irradiated, the first fluorescent ink 13 emits light having a peak wavelength $\lambda_{1C}$ of about 525 nm, which is light of green color (first color). On the other hand, when the UV-A is irradiated, the first fluorescent ink 13 emits light having a peak wavelength $\lambda_{1A}$ of about 445 nm, which is light of blue color (second color).

As shown in FIG. 12A, when the UV-C is irradiated, light having a wavelength of about 445 nm is also emitted. However, the light having a wavelength of about 445 nm has an intensity that is smaller than an intensity of the light having a peak wavelength $\lambda_{1A}$ of about 525 nm. Thus, when the UV-C is irradiated, the light emitted from the first fluorescent ink 13 is viewed as light of green color. Similarly, when the UV-A is irradiated, although the light having a wavelength of about 525 nm is emitted, as shown in FIG. 12A, since an intensity thereof is small, the light emitted from the first fluorescent ink 13 is viewed as light of blue color.

(Second Fluorescent Ink)

Next, the second fluorescent ink 14 is described. In FIG. 12B, the one-dot chain lines show the fluorescent emission spectrum of the second fluorescent ink 14 when the UV-A is irradiated. The solid line shows the fluorescence emission spectrum of the second fluorescent ink 14 when the UV-C is irradiated. Similarly to the case shown in FIG. 12A, each fluorescence emission spectrum shown in FIG. 12B is normalized such that a peak intensity at the maximum peak is 1.

As shown in FIG. 12B, when the UV-C is irradiated, the second fluorescent ink 14 emits light having a peak wavelength $\lambda_{2C}$ of about 525 nm, which is light of green color (first color) or light of a color that is viewed as the same color as the green color (first color). On the other hand, when the UV-A is irradiated, the second fluorescent ink 14 emits light having a peak wavelength $\lambda_{2A}$ of about 610 nm, which is light of red color (third color).

As shown in FIG. 12B, when the UV-C is irradiated, light having a wavelength of about 610 nm is also emitted. However, the light having a wavelength of about 610 nm has an intensity that is smaller than an intensity of the light having a peak wavelength $\lambda_{2C}$ of about 525 nm. Thus, when the UV-C is irradiated, the light emitted from the second fluorescent ink 14 is viewed as light of green color.

Next, the chromaticities of light emitted from the first fluorescent ink 13 and the second fluorescent ink 14 when the UV-A or the UV-C is irradiated are described in more detail with reference to FIG. 13. As to symbols shown in FIG. 13, a blank square represents a chromaticity of light emitted from the first fluorescent ink 13 upon irradiation of the UV-A, and a blank triangle represents a chromaticity of light emitted from the second fluorescent ink 14 upon irradiation of the UV-A. A black square represents a chromaticity of light emitted from the first fluorescent ink 13 upon irradiation of the UV-C, and a black triangle represents a chromaticity of light emitted from the second fluorescent ink 14 upon irradiation of the UV-C.

The aforementioned green color (first color) corresponds to the chromaticity represented by the black square shown in FIG. 13. The aforementioned blue color (second color) corresponds to the chromaticity represented by the blank square in shown FIG. 13. The aforementioned red color (third color) corresponds to the blank triangle shown in FIG. 13.

As shown in FIG. 13, in the xy chromaticity diagram, the chromaticity of the light emitted from the first fluorescent ink 13 upon irradiation of the UV-C and the chromaticity of the light emitted from the second fluorescent ink 14 upon irradiation of the UV-C are close to each other. Thus, as described above, the light emitted from the second fluorescent ink 14 when the UV-C is irradiated is viewed as light of the same color as the color of light emitted from the first fluorescent ink 13 upon irradiation of the UV-C. Thus, the first pattern elements 20 formed by using the first fluorescent ink 13 and the second pattern elements 25 formed by using the second fluorescent ink 14 are viewed as micro-characters of the same color upon irradiation of the UV-C. Therefore, as described below, upon irradiation of the UV-C, all the micro-characters in the light-emitting image 12 are viewed as micro-characters of the monochromatic color (green color), whereby the latent image of the first pattern elements 20 does not appear.

As shown in FIG. 13, in the xy chromaticity diagram, the chromaticity of the light emitted from the first fluorescent ink 13 upon irradiation of the UV-A and the chromaticity of the light emitted from the second fluorescent ink 14 upon irradiation of the UV-C are greatly distant from each other. Thus, the light emitted from the second fluorescent ink 14 when the UV-A is irradiated is viewed as light of a color that is different from the color of light emitted from the first fluorescent ink 13 upon irradiation of the UV-A. Thus, upon irradiation of UV-A, the first pattern elements 20 formed by using the first fluorescent ink 13 and the second pattern elements 25 formed by using the second fluorescent ink 14 are viewed as micro-characters of different colors. Therefore, as described below, upon irradiation of the UV-A, the latent image of the first pattern elements 20 can be viewed.

Next, an operation of this embodiment as structured above is described. Herein, a method of manufacturing the anti-counterfeit medium 10 is firstly described. Then, there is described a method of examining whether a valuable paper made of the anti-counterfeit medium 10 is genuine or not.

Method of Manufacturing Anti-Counterfeit Medium

At first, the substrate 11 is prepared. As the substrate 11, there is used a 188-μm thick substrate made of white polyethylene terephthalate. Then, by using the first fluorescent ink 13 and the second fluorescent ink 14, the light-emitting image 12 composed of the first pattern elements 20 and the second pattern elements 25 is formed on the substrate 11.

At this time, as the first fluorescent ink 13 and the second fluorescent ink 14, there are used offset lithographic inks each of which is obtained by, for example, adding 8 wt % of microsilica, 2 wt % of organic bentonite, 50 wt % of alkyd resin and 15 wt % of alkyl benzene-based solvent, to 25 wt % of dichromatic fluorescent material having predetermined fluorescent properties. As the dichromatic material (first fluorescent material) for the first fluorescent ink 13, there is used a fluorescent material DE-GB (manufactured by Nemoto & Co., Ltd.) which emits light of green color when being excited by ultraviolet light having a wavelength of 254 nm, and emits light of blue color when being excited by ultraviolet light having a wavelength of 365 nm. As the dichromatic material (second fluorescent material) for the second fluorescent ink 14, there is used a fluorescent material DE-GR (manufactured by Nemoto & Co., Ltd.) which emits light of green color when being excited by ultraviolet light having a wavelength of 254 nm, and emits light of red color when being excited by ultraviolet light having a wavelength of 365 nm. The dichromatic fluorescent materials of the first and second fluorescent inks 13 and 14 are respectively selected such that, when ultraviolet light having a wavelength of 254 nm is irradiated, a color difference $\Delta E^*_{ab}$ between the light of green color emitted from the first fluorescent ink 13 and the light of green color emitted from the second fluorescent ink 14 is not more than 10, preferably not more than 3.

Confirmation Method

Next, a method of examining (confirming) whether a valuable paper made of the anti-counterfeit medium 10 is genuine or not is described with reference to FIGS. 14A and 14B.

(Case of Irradiation of UV-C)

Figure 14A:
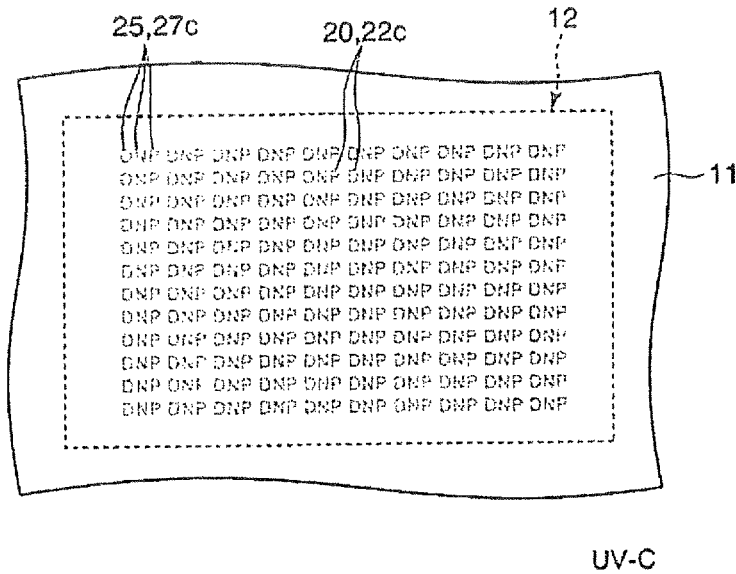
FIG. 14A is a plan view showing a light-emitting image when the UV-C is irradiated thereon, in the third embodiment of the present invention.

FIG. 14A is a plan view showing the light-emitting image 12 of the anti-counterfeit medium 10 when the UV-C is irradiated thereon. Since the first fluorescent ink 13 forming the first pattern elements 20 contains the fluorescent material DE-GB, the first fluorescent ink 13 emits light of green color. Thus, the first pattern elements 20 are viewed as the green portions 22c. On the other hand, since the second fluorescent ink 14 forming the second pattern elements 25 contains the fluorescent material DE-GR, the second fluorescent ink 14 emits light of green color. Thus, the second pattern elements 25 are also viewed as green portions 27c. Namely, when the UV-C is irradiated, the first patter elements 20 and the second pattern elements 25 are viewed as micro-characters of the same color. Thus, when the UV-C is irradiated, the latent image of the first pattern elements 20 of the light-emitting image 12 does not appear.

(Case of Irradiation of UV-A)

Figure 14B:
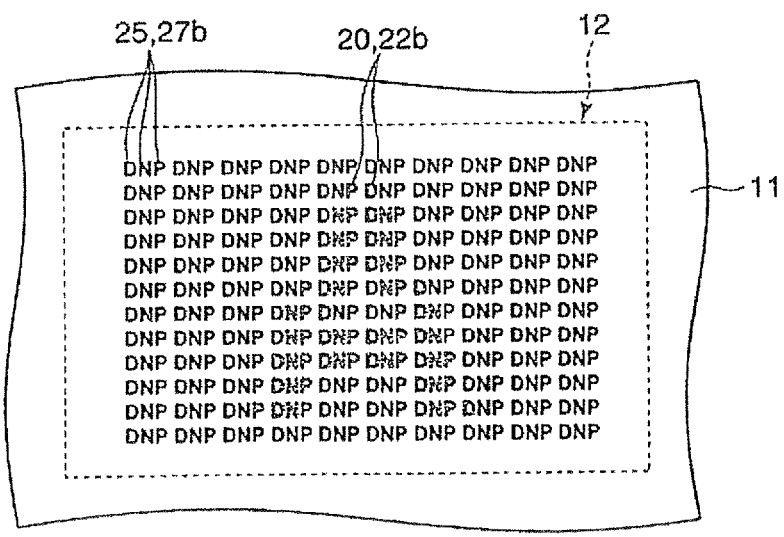
FIG. 14B is a plan view showing the light-emitting image when the UV-A is irradiated thereon, in the third embodiment of the present invention.

FIG. 14B is a plan view showing the light-emitting image 12 of the anti-counterfeit medium 10 when the UV-A is irradiated thereon. Since the first fluorescent ink 13 forming the first pattern elements 20 contains the fluorescent material DE-GB, the first fluorescent ink 13 emits light of blue color. Thus, the first pattern elements 20 are viewed as the blue portions 22b. On the other hand, the second fluorescent ink 14 forming the second pattern elements 25 contains the fluorescent material DE-GR, the second fluorescent ink 14 emits light of red color. Thus, the second pattern elements 25 are viewed as red portions 27b. Namely, when the UV-A is irradiated, the first pattern elements 20 and the second pattern elements 25 are viewed as micro-characters of different colors. Thus, when the UV-A is irradiated, the latent image of the first pattern elements 20 of the light-emitting image 12 can be viewed.

According to this embodiment, the anti-counterfeit medium 10 includes the substrate 11, the plurality of first pattern elements 20 formed on the substrate 11 by using the first fluorescent ink 13 containing the first fluorescent material, and the plurality of second pattern elements 25 formed on the substrate 11 by using the second fluorescent ink 14 containing the second fluorescent material. The first pattern elements 20 and the second pattern elements 25 form a plurality of micro-characters of "D", "N" and "P". The micro-characters form the plurality of micro-character rows m, and the first pattern elements 20 form the latent image in the micro-character rows m. The first fluorescent material of the first fluorescent ink 13 is made of the fluorescent material DE-GB which emits light of green color (first color) when the UV-C is irradiated, and emits light of blue color (second color) when the UV-A is irradiated. Meanwhile, the second fluorescent material of the second fluorescent ink 14 is made of the fluorescent material DE-GR which emits light of green color (first color) or light of a color that is viewed as the same color as the green color (first color) when the UV-C is irradiated, and emits light of red color (third color) when the UV-A is irradiated. Thus, the first pattern elements 20 and the second pattern elements 25 are not discriminated when the UV-C is irradiated. It is not until the UV-A is irradiated that the first pattern elements 20 and the second pattern elements 25 can be discriminated. Namely, when the UV-C is irradiated, the latent image of the first pattern elements 20 is buried in the micro-character rows m and thus cannot be viewed. It is not until the UV-A is irradiated that the latent image of the first pattern elements 20 appears in the micro-character rows m and thus can be viewed.

In this manner, by forming the first pattern elements 20 and the second pattern elements 25 with the use of inks containing the dichromic fluorescent materials, forging of the anti-counterfeit medium 10 can be made difficult as compared with a case in which an ink containing a monochromatic fluorescent material is used. In addition, whether the light-emitting image 12 is genuine or not can be easily and promptly judged by the naked eye.

In addition, by selecting the first fluorescent material of the first fluorescent ink 13 and the second fluorescent material of the second fluorescent ink 14 such that the first fluorescent ink 13 and the second fluorescent ink 14 emit light of the same color or light of colors that are viewed as the same color, when the UV-C is irradiated, the latent image of the light-emitting image 12 can be prevented from being easily found out. Therefore, forging of the anti-counterfeit medium 10 can be made more difficult.

Moreover, the same effects as those of the first embodiment can be obtained.

Modification Example

In this embodiment, there is described the example in which an ink containing the fluorescent material DE-GB is used as the first fluorescent ink 13, and an ink containing the fluorescent material DE-GR is used as the second fluorescent ink 14. Namely, the use of inks of a combination_1 in the below Table 3 is shown by way of example. However, not limited thereto, inks of a combination_2 or a combination_3 in Table 3 may be used as the first fluorescent ink 13 and the second fluorescent ink 14. Similarly to the combination_1, the first fluorescent ink 13 and the second fluorescent ink 14 in the combination_2 or the combination_3 are inks that emit light of the same color or light of colors that are viewed as the same color when the UV-C is irradiated. Thus, the latent image of the light-emitting image 12 can be prevented from being easily found out, whereby forging of the anti-counterfeit medium 10 can be made more difficult.

In Table 3, the names described in the "fluorescent material" column represent product names of Nemoto & Co., Ltd.

TABLE 3

| Combination | | UV-A | UV-C | Fluorescent Material |
|---|---|---|---|---|
| 1 | First Fluorescent Ink | Blue Color | Green Color | DE-GB |
|   | Second Fluorescent Ink | Red Color | Green Color | DE-GR |
| 2 | First Fluorescent Ink | Green Color | Red Color | DE-RG |
|   | Second Fluorescent Ink | Blue Color | Red Color | DE-RB |
| 3 | First Fluorescent Ink | Red Color | Blue Color | DE-BR |
|   | Second Fluorescent Ink | Green Color | Blue Color | DE-BG |

Another Embodiment

In this embodiment, there is described the example in which the second fluorescent ink 14 is made of a dichromatic fluorescent material. However, not limited thereto, similarly to the second embodiment shown in FIGS. 10 to 11B, the second fluorescent ink 14 may be made of a monochromatic fluorescent material. The combination of the first fluorescent ink 13 and the second fluorescent ink 14 is not particularly limited, and various combinations may be suitably selected as shown in the below Table 4.

In Table 4, the names described in the "fluorescent material" column represent product names of Nemoto & Co., Ltd.

TABLE 4

| Combination | | UV-A | UV-C | Fluorescent Material |
|---|---|---|---|---|
| 1 | First Fluorescent Ink | Blue color | Green Color | DE-GB |
|   | Second Fluorescent Ink | Achromatic Color | Green Color | GG-49 |
| 2 | First Fluorescent Ink | Red Color | Green Color | DE-GR |
|   | Second Fluorescent Ink | Achromatic Color | Green Color | GG-49 |
| 3 | First Fluorescent Ink | Green Color | Red Color | DE-RG |
|   | Second Fluorescent Ink | Achromatic Color | Red Color | DE-RN |
| 4 | First Fluorescent Ink | Blue Color | Red Color | DE-RB |
|   | Second Fluorescent Ink | Achromatic Color | Red Color | DE-RN |
| 5 | First Fluorescent Ink | Red Color | Blue color | DE-BR |
|   | Second Fluorescent Ink | Achromatic Color | Blue color | DE-BN |
| 6 | First Fluorescent Ink | Green Color | Blue color | DE-BG |
|   | Second Fluorescent Ink | Achromatic Color | Blue color | DE-BN |

In this embodiment, there is described the example in which the first pattern elements 20 are formed by using the first fluorescent ink 13 and the second pattern elements 25 are formed by using the second fluorescent ink 14. However, not limited thereto, the first pattern elements 20 may be formed by using the second fluorescent ink 14, and the second pattern elements 25 may be formed by using the first fluorescent ink 13. Also in this case, the latent image of the light-emitting image 12, which is formed by the first pattern elements 20, cannot be viewed when the UV-C is irradiated. It is not until the UV-A is irradiated that the latent image of the light-emitting image 12 can be viewed. Thus, forging of the anti-counterfeit medium 10 can be made difficult.

In the above respective embodiments, there is described the example in which the color of light emitted from the first fluorescent ink 13 or the second fluorescent ink 14 is any of the blue color, the red color and the green color. However, not limited thereto, as the inks 13 and 14, there may be used inks of various combinations that are viewed as inks of the same color when the invisible light within the first wavelength range is irradiated, and viewed as inks of different colors when the invisible light within the second wavelength range is irradiated.

In the above respective embodiments, there is described the example in which, when the invisible light within the second wavelength range is irradiated, the first fluorescent material emits light of the second color, and the second fluorescent material emits light of the third color or does not emit light, whereby the first pattern elements containing the first fluorescent material and the second pattern elements containing the second fluorescent material are viewed as areas of different colors from each other. However, the present invention is not limited thereto.

Namely, the color of light emitted from the first fluorescent color can be optionally set, as long as, when the invisible light within the first wavelength range is irradiated, the first fluorescent material and the second fluorescent material emit light of colors that are viewed as the same color with each other, and when the invisible light within the second wavelength range is irradiated, the first pattern elements containing the first fluorescent material and the second pattern elements containing the second fluorescent material are viewed as areas of different colors from each other.

For example, there may be used the first fluorescent material which emits light of the first color when the first invisible light within the first wavelength range is irradiated, and also emits light of the first color or light of a color that is viewed as the same color as the first color when the invisible light within the second wavelength range is irradiated. In this case, when the invisible light within the first wavelength range is irradiated, the first fluorescent material emits light of the first color, and the second fluorescent material emits light of of the first color or light of a color that is viewed as the same color as the first color. Thus, the first pattern elements and the second pattern elements are viewed as pattern elements of the same color with each other. On the other hand, when the invisible light within the second wavelength range is irradiated, the first fluorescent material emits light of the first color or light of a color that is viewed as the same color as the first color, and the second fluorescent material emits light of the third color or does not emit light. Thus, the first pattern elements and the second pattern elements are viewed as pattern elements of colors different from each other. Therefore, when the invisible light within the first wavelength range is irradiated, the latent image of the light-emitting image formed by the first pattern elements is buried in the micro-character rows, and thus cannot be viewed. It is not until the invisible light of the second wavelength range is irradiated that the latent image of the light-emitting image appears in the micro-character rows and thus can be viewed. Accordingly, the light-emitting image can be easily and promptly confirmed, and the pattern of the light-emitting image can be prevented from being easily found out.

Fourth Embodiment

In the respective above embodiments, the latent image of the first pattern elements 20 cannot be viewed when one of the UV-A and the UV-C is irradiated, but can be viewed when the other of the UV-A and the UV-C is irradiated. However, the latent image of the first pattern elements 20 may not viewed upon irradiation of the UV-A or the UV-C, but may be viewed only when the UV-A and the UV-C are simultaneously irradiated.

At this time, the first fluorescent ink 13 emits light having a peak wavelength of about 610 nm, which is light of red color (first color), when the UV-A is irradiated, and emits light having a peak wavelength of about 520 nm, which is light of green color (second color), when the UV-C is irradiated. When the UV-A and the UV-C are simultaneously irradiated, the first fluorescent ink 13 emits light of yellow color (fifth color). For example, the aforementioned fluorescent material DE-GR can be used as the first fluorescent ink 13.

Meanwhile, the second fluorescent ink 14 emits light having a peak wavelength (emission wavelength) of about 615 nm, which is light of red color (third color) when the UV-A is irradiated, and emits light having a peak wavelength of about 515 nm, which is light of green color (fourth color), when the UV-C is irradiated. When the UV-A and the UV-C are simultaneously irradiated, the second fluorescent ink 14 emits light of yellow color (sixth color). As the second fluorescent ink 14, there may be used a fluorescent medium DE-GR1 (manufactured by Nemoto & Co., Ltd.) which has an emission wavelength that is different from that of the fluorescent material DE-GR by not more than 5 nm. Namely, the emission wavelength on the side of a short wavelength of the fluorescent material DE-GR1 is smaller than that of DE-GR by about 5 nm, and the emission wavelength on the side of a long wavelength thereof is larger than that of DE-GR by about 5 mn.

The red color (first color) having a peak wavelength of about 610 nm and the red color (third color) having a peak wavelength of about 615 nm are viewed as the same color. In addition, the green color (second color) having a peak wavelength of about 520 nm and the green color (fourth color) having a wavelength of about 515 nm are viewed as the same color.

On the other hand, when the UV-A and the UV-C are simultaneously irradiated, since a color difference $\Delta E^*_{ab}$ between the light of the yellow color (fifth color) emitted by the first fluorescent ink 13 and light of the the yellow color (sixth color) emitted by the second fluorescent ink 14 is about 12, the former yellow color and the latter yellow color are viewed as different colors.

Since the first fluorescent ink 13 contains the fluorescent medium DE-GR and the second fluorescent ink 14 contains the fluorescent medium DE-GR1, when only the UV-A is irradiated, the first pattern elements 20 and the second pattern elements 25 are viewed as micro-characters of the same color (red color). Therefore, the latent image of the first pattern elements 20 of the light-emitting image 12 is buried in the micro-character rows m, and thus does not appear. When only the UV-C is irradiated, the first pattern elements 20 and the second pattern elements 25 are viewed as micro-characters of the same color (green color). Therefore, the latent image of the first pattern elements 20 of the light-emitting image 12 is buried in the micro-character rows m, and thus does not appear. When the UV-A and the UV-C are simultaneously irradiated, the first pattern elements 20 and the second pattern elements 25 are viewed as micro-characters of yellow colors that are different from each other. Therefore, the latent image of the first pattern elements 20 of the light-emitting image 12 appears in the micro-character rows m, and thus can be viewed.

That is to say, when the UV-A is irradiated or when the UV-C is irradiated, the latent image of the first pattern elements 20 is buried in the micro-character rows m, and thus cannot be viewed. It is not until the UV-A and the UV-C are simultaneously irradiated, the latent image of the first pattern elements 20 appears in the micro-character rows m and thus can be viewed.

In this manner, forging of the anti-counterfeit medium 10 can be made more difficult, by selecting the dichromatic fluorescent material contained in the ink forming the first pattern elements 20 and the dichromatic fluorescent material contained in the ink forming the second pattern elements 25 such that an emission wavelength difference therebetween is not more than 5 nm.

Further, the first pattern elements 20 and the second pattern elements 25 form the plurality of micro-character rows m. Thus, even when there is a slight color difference or thickness difference between the first pattern element 20 and the second pattern element 25, the latent image of the first pattern elements 20 is difficult to be viewed, upon irradiation of the UV-A or upon irradiation of the UV-C. Namely, since the latent image of the light-emitting image 12 can be prevented from being easily found out, forging of the anti-counterfeit medium 10 can be made furthermore difficult.

The fluorescent medium DE-RB may be used as the first fluorescent ink 13, and a fluorescent medium DE-RB1 (manufactured by Nemoto & Co., Ltd), which has an emission wavelength that is different from that of the fluorescent material DE-RB by not more than 5 nm, may be used as the second fluorescent ink 14. In this case, upon irradiation of the UV-A, the first pattern elements 20 and the second pattern elements 25 are viewed as micro-characters of the same color (blue color). Therefore, the latent image of the first pattern elements 20 is buried in the micro-character rows m, and thus does not appear. Upon irradiation of the UV-C, the first patter elements 20 and the second pattern elements 25 are viewed as micro-characters of the same color (red color). Therefore, the latent image of the first pattern elements 20 is buried in the micro-character rows m, and thus does not appear. Upon simultaneous irradiation of the UV-A and the UV-C, the first pattern elements 20 and the second pattern elements 25 are viewed as micro-characters of magenta colors that are different from each other. Therefore, the latent image of the first pattern elements 20 appears in the micro-character rows m, and thus can be viewed.

The fluorescent medium DE-BG may used as the first fluorescent ink 13, and a fluorescent medium DE-BG1 (manufactured by Nemoto & Co., Ltd), which has an emission wavelength that is different from that of the fluorescent material DE-BG by not more than 5 nm, may be used as the second fluorescent ink 14. In this case, upon irradiation of the UV-A, the first pattern elements 20 and the second pattern elements 25 are viewed as micro-characters of the same color (green color). Therefore, the latent image of the first pattern elements 20 is buried in the micro-character rows m, and thus does not appear. Upon irradiation of the UV-C, the first patter elements 20 and the second pattern elements 25 are viewed as micro-characters of the same color (blue color). Therefore, the latent image of the first pattern elements 20 is buried in the micro-character rows m, and thus does not appear. Upon simultaneous irradiation of the UV-A and the UV-C, the first pattern elements 20 and the second pattern elements 25 are viewed as micro-characters of cyan colors that are different from each other. Therefore, the latent image of the first pattern elements 20 appears in the micro-character rows m, and thus can be viewed.

Fifth Embodiment

When the UV-A is irradiated or when the UV-C is irradiated, the latent image of the first pattern elements 20 may be viewed, and when the UV-A and the UV-C are simultaneously irradiated, the latent image of the first pattern elements 20 may disappear (not be viewed).

For example, the anti-counterfeit medium 10 is formed by using the above-described fluorescent material DE-RG as the first fluorescent ink 13 and by using the above-described fluorescent material DE-GR as the second fluorescent ink 14. Such an anti-counterfeit medium 10 is viewed as white as a whole under the visible light, and the latent image of the first pattern elements 20 does not appear.

When only the UV-A is irradiated on the anti-counterfeit medium 10, the first fluorescent ink 13 (fluorescent material DE-RG) forming the first pattern elements 20 emits light of green color. On the other hand, the second fluorescent ink 14 (fluorescent material DE-GR) forming the second pattern elements 25 emits light of red color. Thus, the first pattern elements 20 and the second pattern elements 25 are viewed as micro-characters of different colors. Therefore, upon irradiation of the UV-A, the latent image of the first pattern elements 20 of the light-emitting image 12 appears in the micro-character rows m, and thus can be viewed.

When only the UV-C is irradiated on the anti-counterfeit medium 10, the first fluorescent ink 13 (fluorescent material DE-RG) forming the first pattern elements 20 emits light of red color. On the other hand, the second fluorescent ink 14 (fluorescent material DE-GR) forming the second pattern elements 25 emits light of green color. Thus, the first pattern elements 20 and the second pattern elements 25 are viewed as micro-characters of different colors. Therefore, upon irradiation of the UV-C, the latent image of the first pattern elements 20 of the light-emitting image 12 appears in the micro-character rows m, and thus can be viewed.

When the UV-A and the UV-C are simultaneously irradiated on the anti-counterfeit medium 10, the first fluorescent ink 13 (fluorescent material DE-RG) forming the first pattern elements 20 emits light of yellow color. Similarly, the second fluorescent ink 14 (fluorescent material DE-GR) forming the second pattern elements 25 emits light of yellow color. Thus, the first pattern elements 20 and the second pattern elements 25 are viewed as micro-characters of the same color. Therefore, upon simultaneous irradiation of the UV-A and the UV-C, the latent image of the first pattern elements 20 of the light-emitting image 12 is buried in the micro-character ranges m, and thus does not appear.

In this manner, since the light-emitting image 12 varies along with the respective three irradiation patterns, i.e., the irradiation of UV-A, the irradiation of UV-C and the simultaneous irradiation of UV-A and UV-C, in such a manner that the latent image of the first pattern elements 20 is buried in the micro-character rows m and thus does not appear upon simultaneous irradiation of UV-A and UV-C, forging of the anti-counterfeit medium 10 can be made furthermore difficult.

Further, the first pattern elements 20 and the second pattern elements 25 form the plurality of micro-character rows m. Thus, even when there is a slight color difference or thickness difference between the first pattern element 20 and the second pattern element 25, the latent image of the first pattern elements 20 is difficult to be viewed, upon irradiation of the UV-A or upon irradiation of the UV-C. Namely, the light-emitting image 12 can more reliably vary in the respective three irradiation patterns. Thus, forging of the anti-counterfeit medium 10 can be made furthermore difficult.

The fluorescent medium DE-RB may be used as the first fluorescent ink 13, and the fluorescent medium DE-BR may be used as the second fluorescent ink 14. In this case, upon irradiation of the UV-A, the first fluorescent ink 13 (fluorescent material DE-RB) forming the first pattern elements 20 emits light of blue color, and the second fluorescent ink 14 (fluorescent material DE-BR) forming the second fluorescent elements 25 emits light of red color. Thus, the first pattern elements 20 and the second pattern elements 25 are viewed as micro-characters of different colors. Therefore, the latent image of the first pattern elements 20 appears in the micro-character rows m, and thus can be viewed. Upon irradiation of the UV-C, the first fluorescent ink 13 (fluorescent material DE-RB) forming the first pattern elements 20 emits light of red color, and the second fluorescent ink 14 (fluorescent material DE-BR) forming the second fluorescent elements 25 emits light of blue color. Thus, the first pattern elements 20 and the second pattern elements 25 are viewed as micro-characters of different colors. Therefore, the latent image of the first pattern elements 20 appears in the micro-character rows m, and thus can be viewed. Upon simultaneous irradiation of the UV-A and the UV-C, the first pattern elements 20 and the second pattern elements 25 are viewed as micro-characters of the same magenta color. Therefore, the latent image of the first pattern elements 20 is buried in the micro-character rows m, and thus does not appear.

The fluorescent medium DE-BG may be used as the first fluorescent ink 13, and the fluorescent medium DE-GB may be used as the second fluorescent ink 14. In this case, upon irradiation of the UV-A, the first fluorescent ink 13 (fluorescent material DE-BG) forming the first pattern elements 20 emits light of green color, and the second fluorescent ink 14 (fluorescent material DE-GB) forming the second fluorescent elements 25 emits light of blue color. Thus, the first pattern elements 20 and the second pattern elements 25 are viewed as micro-characters of different colors. Therefore, the latent image of the first pattern elements 20 appears in the micro-character rows m, and thus can be viewed. Upon irradiation of the UV-C, the first fluorescent ink 13 (fluorescent material DE-BG) forming the first pattern elements 20 emits light of blue color, and the second fluorescent ink 14 (fluorescent material DE-GB) forming the second fluorescent elements 25 emits light of green color. Thus, the first pattern elements 20 and the second pattern elements 25 are viewed as micro-characters of different colors. Therefore, the latent image of the first pattern elements 20 appears in the micro-character rows m, and thus can be viewed. Upon simultaneous irradiation of the UV-A and the UV-C, the first pattern elements 20 and the second pattern elements 25 are viewed as micro-characters of the same cyan color. Therefore, the latent image of the first pattern elements 20 is buried in the micro-character rows m and thus does not appear.

Further, when the fluorescent material DE-RG is used as the first fluorescent ink 13 and the fluorescent material DE-GR is used as the second fluorescent ink 14 is used, an ink of yellow color may be offset-printed on the substrate 11, and the the first fluorescent ink 13 and the second fluorescent ink 14 may be offset-printed thereon. Similarly, when the fluorescent medium DE-RB is used as the first fluorescent ink 13 and the fluorescent medium DE-BR is used as the second fluorescent ink 14, an ink of magenta color may be offset-printed on the substrate 11, and the the first fluorescent ink 13 and the second fluorescent ink 14 may be offset-printed thereon. Similarly, when the fluorescent medium DE-BG is used as the first fluorescent ink 13 and the fluorescent medium DE-GB is used as the second fluorescent ink 14, an ink of cyan color may be offset-printed on the substrate 11, and the the first fluorescent ink 13 and the second fluorescent ink 14 may be offset-printed thereon. This operation facilitates that the light-emitting image 12 is viewed as a monochromatic image as a whole, upon simultaneous irradiation of the UV-A and the UV-C.

In the above respective second to fifth embodiments, similarly to the modification example of the first embodiment shown in FIGS. 8A to 9B, one micro-character may be formed to include the first pattern element 20 and the second pattern element 25.

In the above respective embodiments, there is described the example in which inks having excitation properties to the UV-A or the UV-C are used as the first fluorescent ink 13 and the second fluorescent ink 14. However, not limited thereto, inks having excitation properties to UV-B or infrared light may be used as the first fluorescent ink 13 and the second fluorescent ink 14. Namely, invisible light within an optional wavelength range may be used as the "invisible light within a first wavelength range" or the "invisible light within a second wavelength range".

In the above respective embodiments, the latent image may be a figure or the like.

In the above respective embodiments, there is described the example in which the first pattern elements 20 and the second pattern elements 25 are respectively viewed as micro-characters of white color under the visible light. However, not limited thereto, it is sufficient that the first pattern elements 20 and the second pattern elements 25 are viewed as micro-characters of the same color, at least under the visible light.

In the fourth and fifth embodiments, the color of light emitted from the first fluorescent ink 13 or the second fluorescent 14 is any of the blue color, the red color and the green color, when the invisible light within the first wavelength range or the invisible light within the second wavelength range is independently irradiated. However, not limited thereto, in the fourth embodiment, there may be used, as the inks 13 and 14, various combinations of inks that are viewed as inks of the same color when the invisible light within the first wavelength range or the invisible light within the second wavelength range is independently irradiated, and viewed as inks of different colors when the invisible light within the first wavelength range and the invisible light within the second wavelength range are simultaneously irradiated. In the fifth embodiment, there may be used, as the inks 13 and 14, various combinations of inks that are viewed as inks of different colors when the invisible light within the first wavelength range or the invisible light within the second wavelength range is independently irradiated, and viewed as inks of the same color when the invisible light within the first wavelength range and the invisible light within the second wavelength range are simultaneously irradiated.

In the above respective embodiments, there is described the example in which the light-emitting medium of the present invention is used as the anti-counterfeit medium constituting a valuable paper and so on. However, not limited thereto, the light-emitting medium of the present invention can be used in various other applications such as a toy. Also in this case, various functions or qualities can be given to the toy or the like, by the light-emitting image formed of the first pattern elements and the second pattern elements which vary when at least one of the invisible light within the first wavelength range and the invisible light within the second wavelength range is irradiated thereon.

The invention claimed is:
1. A light-emitting medium including a light-emitting image on a substrate,
wherein:
the light-emitting image includes a plurality of first pattern elements containing a first fluorescent material and a plurality of second pattern elements containing a second fluorescent material;
the plurality of first pattern elements and the plurality of second pattern elements form a plurality of micro-characters;
there is no portion where the first pattern element and the second pattern element are in contact with each other;
the plurality of micro-characters are arranged adjacently both horizontally and vertically to form a plurality of micro-character rows, with each of the first pattern elements configured to form a micro-character portion of a latent image buried in the plurality of micro-character rows;
when invisible light within a first wavelength range is irradiated, the first fluorescent material and the second fluorescent material emit light of colors that are viewed as the same color with each other;
when invisible light within a second wavelength range is irradiated, the first pattern elements and the second pattern elements are viewed as pattern elements of colors different from each other, whereby the latent image in the plurality of micro-character rows is caused to appear; and a size of one micro-character in the plurality of micro-character rows is not more than 300 µm square.

2. The light-emitting medium according to claim 1, wherein when the invisible light within the first wavelength range is irradiated, the first fluorescent material emits light of a first color, and the second fluorescent material emits light of the first color or light of a color that is viewed as the same color as the first color, and when the invisible light within the second wavelength range is irradiated, the first fluorescent material emits light of a second color, and the second fluorescent material emits light of a third color or does not emit light, so that the first pattern elements and the second pattern elements are viewed as pattern elements of colors different from each other, whereby the latent image in the plurality of micro-character rows is caused to appear.

3. The light-emitting medium according to claim 1, wherein when the invisible light within the first wavelength range is irradiated, the first fluorescent material emits light of a first color, and the second fluorescent material emits light of the first color or light of a color that is viewed as the same color as the first color, and when the invisible light within the second wavelength range is irradiated, the first fluorescent material emits light of the first color or light of a color that is viewed as the same color as the first color, and the second fluorescent material emits light of a third color or does not emit light, so that the first pattern elements and the second pattern elements are viewed as pattern elements of colors different from each other, whereby the latent image in the plurality of micro-character rows is caused to appear.

4. The light-emitting medium according to claim 1, wherein an interval between adjacent micro-characters in the plurality of micro-character rows is not more than 100 µm.

5. A light-emitting medium including a light-emitting image on a substrate, wherein:

the light-emitting image includes a plurality of first pattern elements and a plurality of second pattern elements;

the plurality of first pattern elements and the plurality of second pattern elements form a plurality of micro-characters;

the plurality of micro-characters are arranged adjacently both horizontally and vertically to form micro-character rows, with each of the first pattern elements configured to form a micro-character portion of a latent image buried in the plurality of micro-character rows;

when invisible light within a first wavelength range is irradiated or when invisible light within a second wavelength range is irradiated, the first fluorescent material and the second fluorescent material emit light of colors that are viewed as the same color with each other; and when the invisible light within the first wavelength range and the invisible light within the second wavelength range are simultaneously irradiated, the first fluorescent material and the second fluorescent material emit light of colors that are viewed as different colors from each other, whereby the latent image in the plurality of micro-character rows is caused to appear.

6. A light-emitting medium including a light-emitting image on a substrate, wherein:

the light-emitting image includes a plurality of first pattern elements and a plurality of second pattern elements;

the plurality of first pattern elements and the plurality of second pattern elements form a plurality of micro-characters;

the plurality of micro-characters are arranged adjacently both horizontally and vertically to form a plurality of micro-character rows, with each of the first pattern elements configured to form a micro-character portion of a latent image buried in the plurality of micro-character rows;

when invisible light within a first wavelength range is irradiated, the first fluorescent material and the second fluorescent material emit light of colors that are viewed as different colors from each other, whereby the latent image in the plurality of micro-character rows is caused to appear;

when invisible light within a second wavelength range is irradiated, the first fluorescent material and the second fluorescent material emit light of colors that are viewed as different colors from each other, the color of light being different from the color of light viewed when the invisible light within the first wavelength range is irradiated, whereby the latent image in the plurality of micro-character rows is caused to appear; and when the invisible light within the first wavelength range and the invisible light within the second wavelength range are simultaneously irradiated, the first fluorescent material and the second fluorescent material emit light of colors that are viewed as the same color with each other.

7. A light-emitting medium including a light-emitting image on a substrate, wherein:

the light-emitting image includes a plurality of first pattern elements containing a first fluorescent material and a plurality of second pattern elements containing a second fluorescent material;

the plurality of first pattern elements and the plurality of second pattern elements form a plurality of micro-characters;

the plurality of micro-characters have some micro-characters each of which is composed of the first pattern element and the second pattern element;

the plurality of micro-characters are arranged adjacently both horizontally and vertically to form a plurality of micro-character rows, with each of the first pattern elements configured to form a micro-character portion of a latent image buried in the plurality of micro-character rows;

when invisible light within a first wavelength range is irradiated, the first fluorescent material and the second fluorescent material emit light of colors that are viewed as the same color with each other;

when invisible light within a second wavelength range is irradiated, the first pattern elements and the second pattern elements are viewed as pattern elements of colors different from each other, whereby the latent image in the plurality of micro-character rows is caused to appear; and a size of one micro-character in the plurality of micro-character rows is not more than 300 µm square.

8. The light-emitting medium according to claim 7, wherein when the invisible light within the first wavelength range is irradiated, the first fluorescent material emits light of a first color, and the second fluorescent material emits light of the first color or light of a color that is viewed as the same color as the first color, and when the invisible light within the second wavelength range is irradiated, the first fluorescent material emits light of a second color, and the second fluorescent material emits light of a third color or does not emit light, so that the first pattern elements and the second pattern elements are viewed as pattern elements of colors different from each other, whereby the latent image in the plurality of micro-character rows is caused to appear.

9. The light-emitting medium according to claim 7, wherein when the invisible light within the first wavelength range is irradiated, the first fluorescent material emits light of a first color, and the second fluorescent material emits light of the first color or light of a color that is viewed as the same color as the first color, and when the invisible light within the second wavelength range is irradiated, the first fluorescent material emits light of the first color or light of a color that is viewed as the same color as the first color, and the second fluorescent material emits light of a third color or does not emit light, so that the first pattern elements and the second pattern elements are viewed as pattern elements of colors different colors from each other, whereby the latent image in the plurality of micro-character rows is caused to appear.

10. The light-emitting medium according to claim 7, wherein an interval between adjacent micro-characters in the plurality of micro-character rows is not more than 100 μm.

\* \* \* \* \*